March 11, 1952 L. M. POTTS 2,589,131

COMBINED TELEPHONE AND TELEGRAPH SYSTEM

Original Filed June 7, 1947 15 Sheets-Sheet 1

INVENTOR
LOUIS M. POTTS, DECEASED
MARTHA W.C. POTTS, EXECUTRIX
BY
Emery Robinson
ATTORNEY March 11, 1952 L. M. POTTS 2,589,131

COMBINED TELEPHONE AND TELEGRAPH SYSTEM

Original Filed June 7, 1947 15 Sheets-Sheet 2

INVENTOR
LOUIS M. POTTS, DECEASED
MARTHA W.C. POTTS, EXECUTRIX

BY

Emery Robinson
ATTORNEY

COMBINED TELEPHONE AND TELEGRAPH SYSTEM

Original Filed June 7, 1947 15 Sheets-Sheet 3

INVENTOR
LOUIS M. POTTS, DECEASED
MARTHA W.C. POTTS, EXECUTRIX
BY
Emery Robinson
ATTORNEY

COMBINED TELEPHONE AND TELEGRAPH SYSTEM

Original Filed June 7, 1947 15 Sheets-Sheet 4

INVENTOR
LOUIS M. POTTS, DECEASED
MARTHA W.C. POTTS, EXECUTRIX
BY Emery Robinson
ATTORNEY

COMBINED TELEPHONE AND TELEGRAPH SYSTEM

INVENTOR
LOUIS M. POTTS, DECEASED
MARTHA W. C. POTTS, EXECUTRIX
BY
Emery Robinson
ATTORNEY

COMBINED TELEPHONE AND TELEGRAPH SYSTEM

Original Filed June 7, 1947 15 Sheets-Sheet 6

INVENTOR
LOUIS M. POTTS, DECEASED
MARTHA W. C. POTTS, EXECUTRIX
BY
Emery Robinson
ATTORNEY

COMBINED TELEPHONE AND TELEGRAPH SYSTEM

Original Filed June 7, 1947 15 Sheets-Sheet 7

INVENTOR
LOUIS M. POTTS, DECEASED
BY MARTHA W. C. POTTS, EXECUTRIX
Emery Robinson
ATTORNEY

COMBINED TELEPHONE AND TELEGRAPH SYSTEM

Original Filed June 7, 1947 15 Sheets-Sheet 8

INVENTOR
LOUIS M. POTTS, DECEASED
MARTHA W. C. POTTS, EXECUTRIX
BY
Emery Robinson
ATTORNEY March 11, 1952 L. M. POTTS 2,589,131

COMBINED TELEPHONE AND TELEGRAPH SYSTEM

Original Filed June 7, 1947 15 Sheets-Sheet 9

INVENTOR
LOUIS M. POTTS, DECEASED
MARTHA W. C. POTTS, EXECUTRIX
BY
Emery Robinson
ATTORNEY

COMBINED TELEPHONE AND TELEGRAPH SYSTEM

Original Filed June 7, 1947 15 Sheets-Sheet 10

INVENTOR
LOUIS M. POTTS, DECEASED
MARTHA W.C. POTTS, EXECUTRIX
BY
Emery Robinson
ATTORNEY

COMBINED TELEPHONE AND TELEGRAPH SYSTEM

Original Filed June 7, 1947

INVENTOR
LOUIS M. POTTS, DECEASED
MARTHA W. C. POTTS, EXECUTRIX
BY
Emery Robinson
ATTORNEY INVENTOR
LOUIS M. POTTS, DECEASED
MARTHA W. C. POTTS, EXECUTRIX
BY Emery Robinson
ATTORNEY

COMBINED TELEPHONE AND TELEGRAPH SYSTEM

Original Filed June 7, 1947 15 Sheets-Sheet 13

INVENTOR
LOUIS M. POTTS, DECEASED
MARTHA W.C. POTTS, EXECUTRIX
BY
Emery Robinson
ATTORNEY

COMBINED TELEPHONE AND TELEGRAPH SYSTEM

Original Filed June 7, 1947 15 Sheets-Sheet 14

INVENTOR
LOUIS M. POTTS, DECEASED
MARTHA W. C. POTTS, EXECUTRIX
BY
Emery Robinson
ATTORNEY

COMBINED TELEPHONE AND TELEGRAPH SYSTEM

Original Filed June 7, 1947 15 Sheets-Sheet 15

INVENTOR
LOUIS M. POTTS, DECEASED
MARTHA W.C. POTTS, EXECUTRIX
BY
Emery Robinson
ATTORNEY Patented Mar. 11, 1952

2,589,131

UNITED STATES PATENT OFFICE 2,589,131

COMBINED TELEPHONE AND TELEGRAPH SYSTEM

Louis M. Potts, deceased, late of Evanston, Ill., by Martha W. C. Potts, executrix, Evanston, Ill., assignor to Teletype Corporation, Chicago, Ill., a corporation of Delaware Original application June 7, 1947, Serial No. 753,265. Divided and this application November 5, 1948, Serial No. 58,501

8 Claims. (Cl. 178—4)

This invention relates to combined telephone and telegraph systems and more particularly to the use in such systems of combined telephone and telegraph sets.

This application is a division of copending application Serial No. 753,265, filed June 7, 1947, now U. S. Patent Serial No. 2,522,462 of September 12, 1950.

An object of the present invention is to provide printing telegraph apparatus adaptable for use in standard telephone systems.

Another object of the present invention is to provide in a combined telephone and telegraph system, printing telegraph apparatus having no moving parts except while telegraph signals are being transmitted.

A further object of the invention is to provide suitable circuit modifications at a telephone subscriber's station and at a telephone exchange of a standard telephone system, which enables combined telephone and telegraph service to be maintained.

A feature of the invention is to provide a novel form of telegraph transmitter, especially designed for use in the present combined telephone and telegraph system.

Another feature of the invention is the provision of a novel form of receiving selector for a printer having a type segment which is movable in rotary and axial directions to a final printing position.

Still another feature of the invention is the use of a vibrating motor for driving printing telegraph apparatus in which the motor is at rest except during actual telegraph communication intervals.

Other objects, features, and advantages of the invention, although not specifically recited above, will appear as the invention is described in detail.

The present invention provides at telephone subscribers' stations, telephone and telegraph sets combined into one unit. Each telegraph set which is of the five unit code start-stop type includes a transmitter and a receiver which are driven by a vibrating motor utilizing signaling current for its operation. The printer is provided with a type segment movable in rotary and axial directions to a final printing position under the control of a novel form of selector. The printing telegraph apparatus is quiescent except during actual telegraph communication intervals.

To communicate with another subscriber, the calling subscriber removes a telephone handset from a cradle positioned on top of the unit. After hearing the dial tone, the calling subscriber knows that a connection has been made by the usual exchange switching equipment to an idle exchanger sender circuit. The sender circuit utilized in the present invention is a modified form of sender circuit which is responsive to telegraph signals originating at the telegraph transmitter of a calling subscriber. By depressing predetermined keys of the transmitter the calling subscriber may operate an idle sender circuit and thereby become connected with the desired called subscriber in a manner similar to usual telephone dialing practice. The connection established between the calling and called subscribers includes modified district, selector and incoming circuits. The circuit which connects the calling and called subscribers includes modified district selector and incoming circuits.

A more thorough understanding of the invention may be had by reference to the detailed description which follows when read in conjunction with the drawings, wherein.

Figures 1, 32:
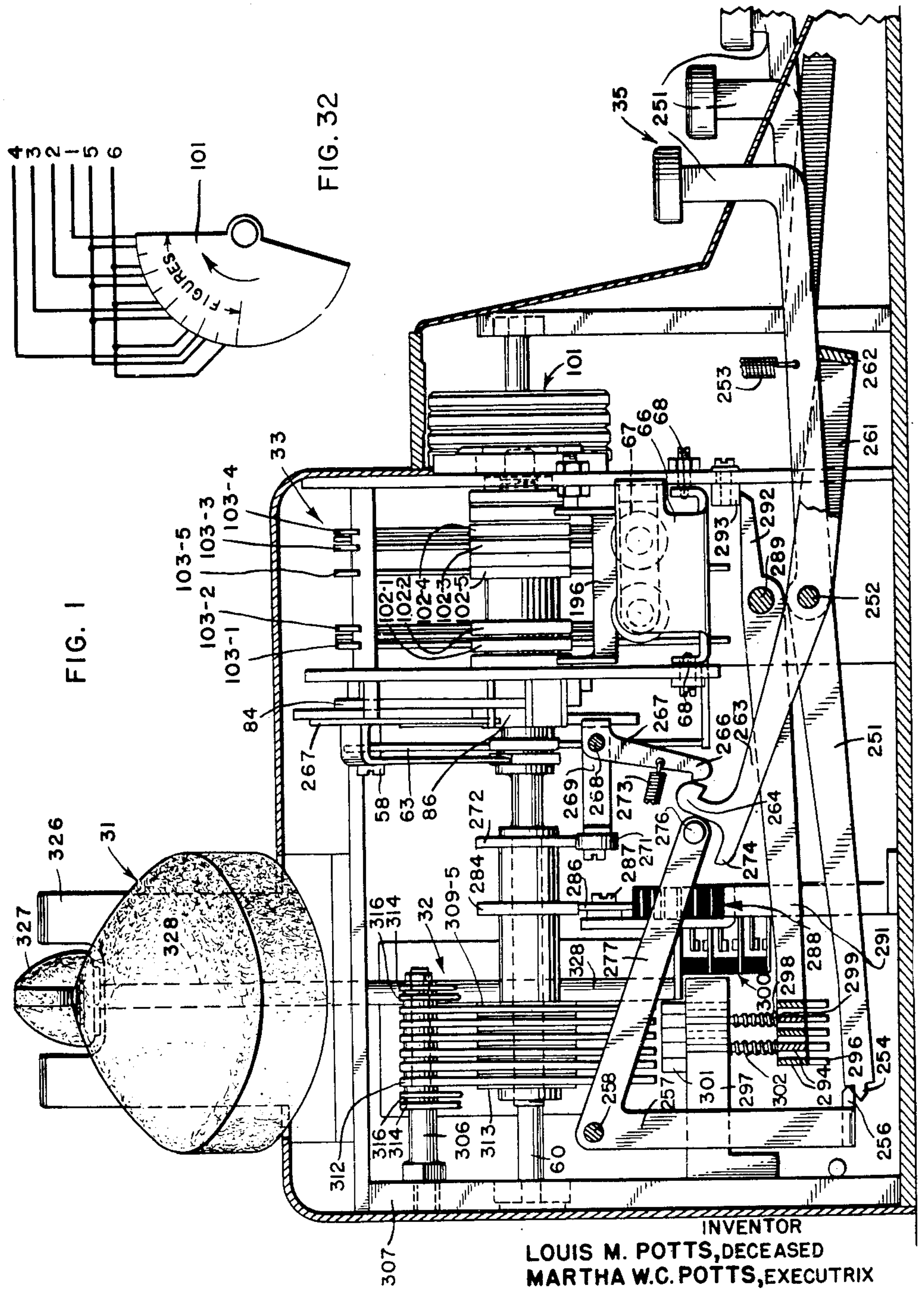
Fig. 1 is a left end elevational view of the combined telephone and telegraph unit taken on the line 1—1 of Fig. 2.
Fig. 32 is a schematic representation of the type segment.
Figure 2:
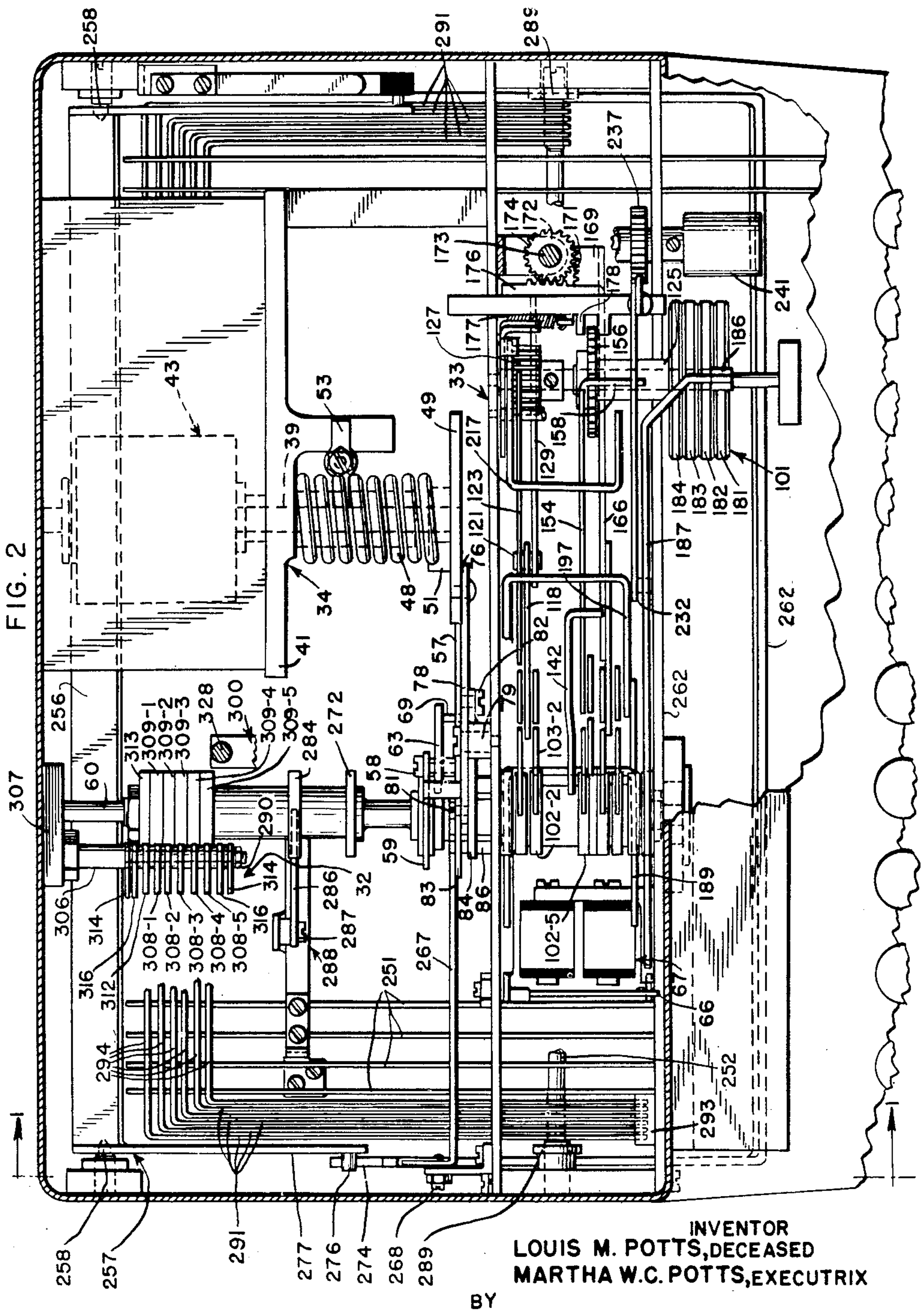
Fig. 2 is a plan view of the apparatus shown in Fig. 1.

With reference to the drawings, a detailed description of the invention will be undertaken. The main component parts of the combined telephone and telegraph unit shown in Figs. 1 and 2 are a telephone 31, a telegraph transmitter 32, a telegraph receiver 33, a vibrating motor 34, and a keyboard 35 which controls the operation of transmitter 32.

Figure 18:
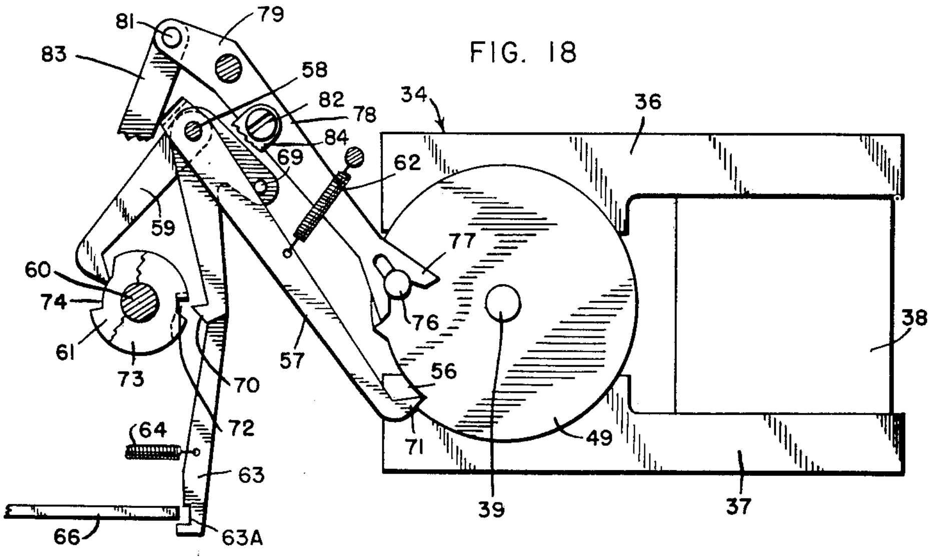
Fig. 18 is a detail view of the vibrating motor.
Figure 23:
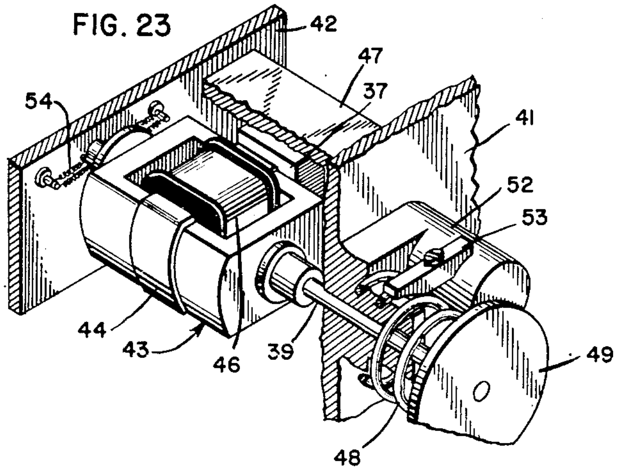
Fig. 23 is a detailed perspective view of the vibrating motor.

The vibrating motor 34 which is best illustrated in Figs. 18 and 23 will first be described. It somewhat resembles the motor disclosed in the patent of L. M. Potts, No. 2,360,579. A magnetic field for the motor is provided by pole pieces 36 and 37 of a permanent magnet 38. Fast to a shaft 39, suitably journaled on supporting members 41 and 42, Fig. 23, is a bipolar armature 43 which includes a soft iron core 44 extending through winding 46, the armature 43 being of magnetic material except for the core 44. Mounted concentric with shaft 39 is a coil spring 48, one end of which is fixed to an oscillating disc 49 by means of lug (not shown), the other end being secured in journaled plate 52 by means of an adjustable lug 53. Adjustable lug 53 is provided to increase or decrease the effective number of turns or fractions of turns of coil 48 which will be free to vibrate as will later be explained.

Armature 43 is designed to oscillate between pole pieces 36 and 37 in response to current reversals received by winding 46 as will later be described in detail. The terminals of winding 46 are suitably connected to conductor garter springs 54 which are attached to supporting member 42, Fig. 23. This enables electric conduction to be maintained to winding 46 despite the oscillation of armature 43 and its winding 46. In the rest position of the apparatus disc 49 is latched up at its notch 56 by means of stop lever 57 which is pivoted at 58 and has a follower arm 59 for engaging the periphery of cam 61 carried by driving shaft 60. At this time stop lever 57 retains spring coil 48 under tension. Stop lever 57 is urged, by means of spring 62, in a counterclockwise direction as viewed in Fig. 18. Also pivotally mounted on shaft 58 is a trip lever 63 which is urged in a clockwise direction by means of a spring 64 which is stronger than spring 62. Normally, armature 66 of selector magnet 67 which is pivoted at points 68 (see Fig. 1) is in blocking relationship with the lower end of trip lever 63.

Figure 22:
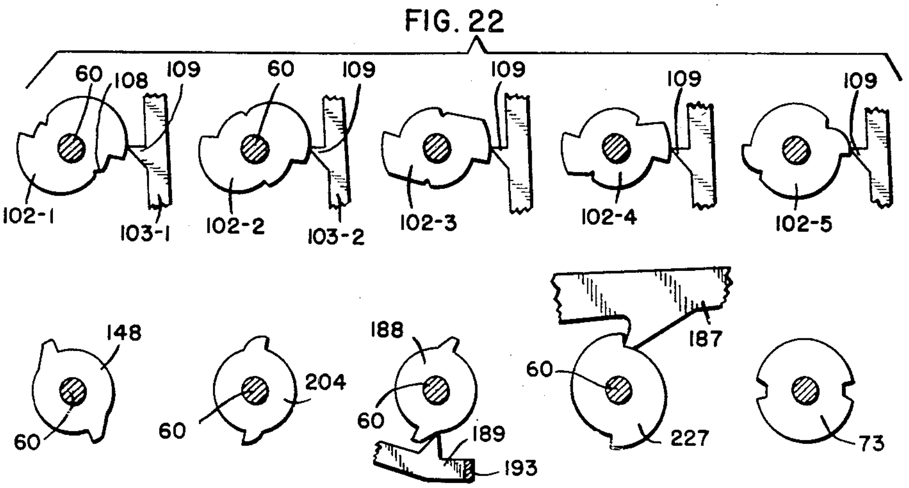
Fig. 22 is a view showing the various cams used in the receiver selector.

On receipt of a start impulse by selector magnet 67, armature 66 moves upwardly to a position opposite a notch 63A and thereby enables spring 64 to draw trip lever 63 to the left (as viewed in Fig. 18) since its projection 70 is free to enter notch 72 of cam 73. It might be mentioned at this time that the cams carried by shaft 60 are designed to function during two signal code combinations in each complete revolution so that the peripheries of the cams are the same at diametrically opposite points as illustrated in Fig. 22. When trip lever 63 moves to the left, by means of its pin 69, it pulls stop lever 57 also to the left, enabling the latter lever to withdraw its hooked end 71 from notch 56 of disc 49. This releases coil spring 48 for vibration. Spring 48 is tuned to vibrate at the same frequency as the alternating current received by winding 46 of armature 43. Thus, when the disc 49 is locked, energy is stored in coil spring 48 and when it is released it immediately vibrates at full amplitude since the winding 46 receives alternating current of the same frequency at this time in a manner to be hereinafter described.

When stop lever 57 is pivoted clockwise as explained, the pointed end of its follower arm 59 is moved out of notch 74 to the high part of cam 61 as shaft 60 is stepped counterclockwise in a manner to be hereinafter explained. During one half revolution of shaft 60, disc 49 makes three complete oscillations and at the termination of the third oscillation stop lever 57 by means of its hooked end 71 engages in notch 56 of disc 49. At this time selector magnet 67 will be in a balanced condition (as will later be explained) and armature 66 will have assumed a position to block trip lever 63. It will be understood that cam 61 is provided with diametrically opposite notches 74 which enable the pointed end of follower arm 59 of lever 57 to pivot counterclockwise after each half revolution and by means of its hooked portion 71 engage notch 56 of disc 49.

The stepping of the shaft 60 will now be described. Oscillating disc 49 carries a pin 76 which engages the forked end 77 of a pallet 78 which is pivoted at 79. Pivoted respectively at 79 on pallet 78 at 81 and 82 is a pair of stepping pawls 83 and 84 (Fig. 21) which drive the ratchet 86 fast to shaft 60. During one half revolution of shaft 60, each pawl 83 and 84 operates three times, moving ratchet 86 one half of a tooth during each stepping operation. As pawl 84, for example, completes its forward stroke after having stepped ratchet 86 a distance equal to one half of a tooth, pawl 83 will have completed its return stroke and be ready to push on the same tooth just advanced by ratchet 86 and thus continue to advance it another half tooth. Meanwhile, the return stroke of pawl 84 will place it in a position to advance the next succeeding tooth and so the cycle continues. It is now clear that as disc 49 vibrates, pallet 78 will be oscillated and shaft 60 will be stepped six times for one half of a revolution or twelve times for a complete revolution. Springs 87 and 88 are provided on pawls 83 and 84 respectively to insure their engagement with the teeth of ratchet 86. It is apparent from the foregoing that the utilization of both the to and fro movements of the oscillating disc 49 for stepping operations enables a current of one half the frequency used as in a case where stepping is accomplished only once in each complete cycle.

Figure 6:
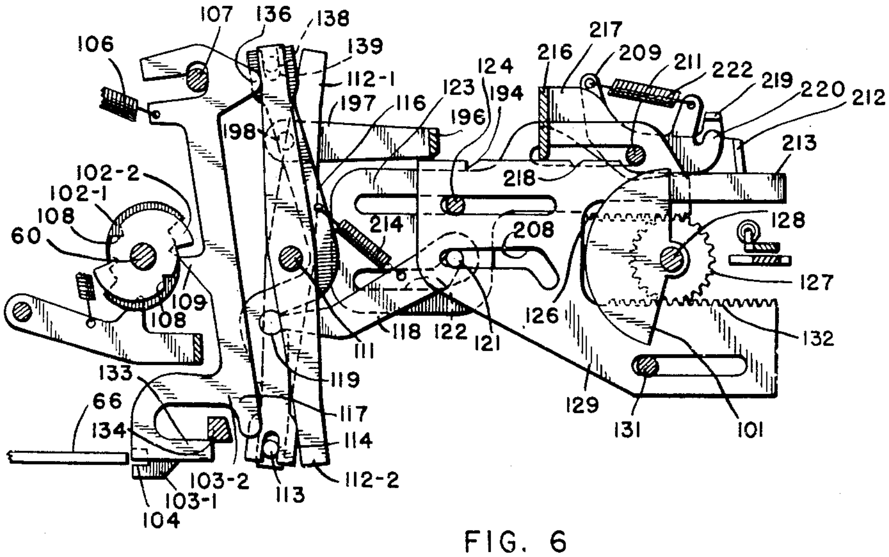
Fig. 6 is a detailed view of a portion of the selector mechanism which controls the rotary position of the type segment.

Next to be described will be the operation of the selector mechanism for controlling the receiver 33. In Fig. 6 is shown the part of the selector mechanism which responds to the first two elements of a signal code combination received by selector magnet 67, it being understood that the instant invention contemplates the use of a five unit code in a start-stop system of telegraphy. The first two elements of a given signal code combination determine the initial rotary position of a type segment 101 in a manner now to be described.

In order that the ensuing detailed description may be more readily followed, a brief outline of the operation of type segment 101 will be given. Type segment 101 is designed to move in response to the first two signal elements of a code combination to one of three rotary positions or it may remain in the zero position as shown in Fig. 6. This provides four possible initial rotary positions in one case position and since the type wheel in the instant invention may be shifted in two case positions, eight possible initial rotary positions may be obtained. In response to the fifth signaling element of a code combination after the initial rotary position has been determined by the first two signal elements the type wheel may be stepped one half or one and a half steps further to a final rotary position to thus give a choice of two characters after the initial rotary position has been determined. The third and fourth elements of a signal code combination determine whether the type segment will remain in its zero axial position or whether it will be moved one, two, or three positions in an axial direction, giving a total of four possible axial positions. Obviously then, the type segment may occupy a total of thirty-two different printing positions in each case position.

Figures 3, 4, 5:
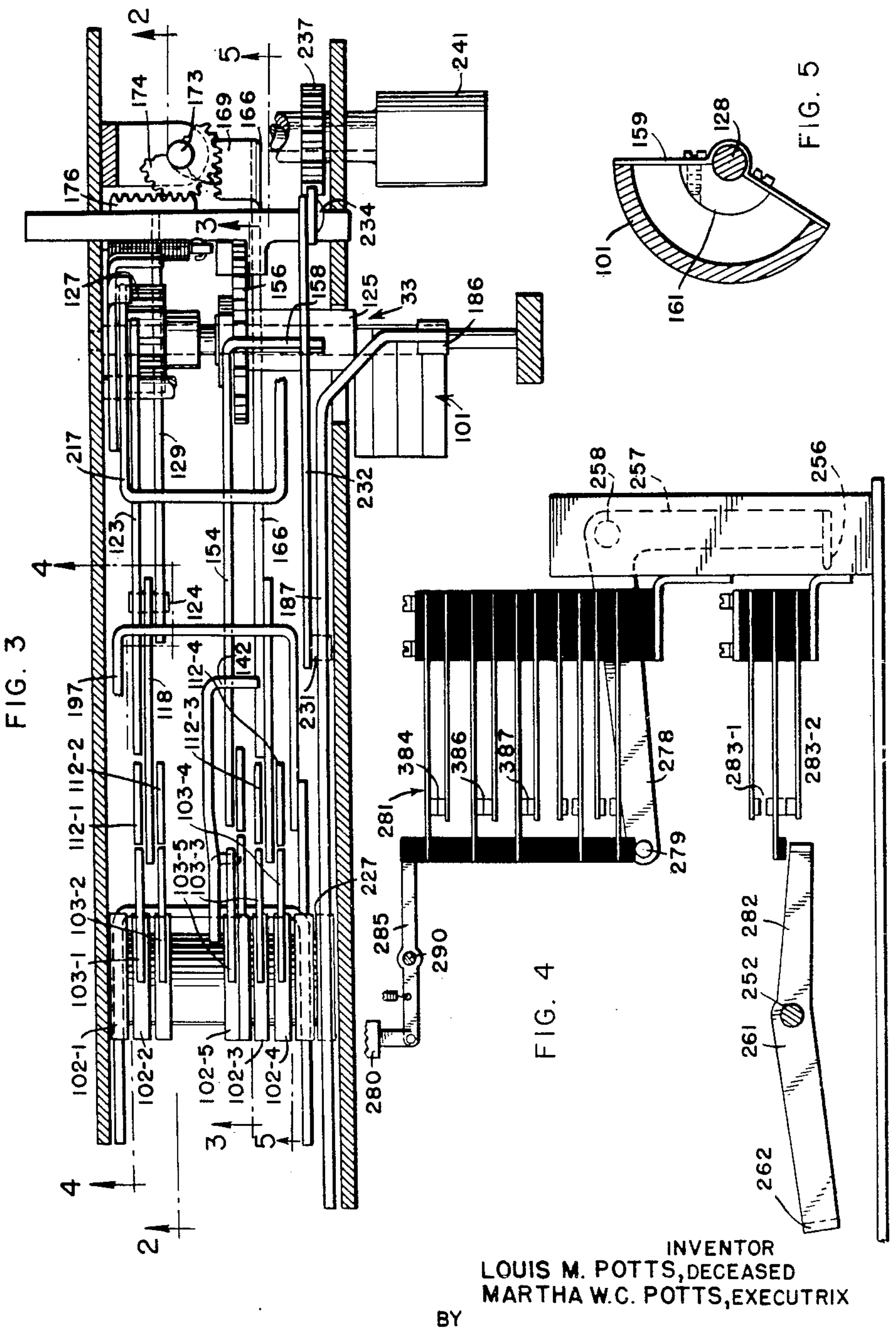
Fig. 3 is a plan view of the receiver selector and printer.
Fig. 4 is an enlarged detail view showing the operation of certain contacts involved in the invention.
Fig. 5 is a detailed view of the type segment.

First to be described will be the operation of type segment 101 in the figures case position represented schematically in Fig. 32. Carried by the shaft 60, the stepping of which was previously described above, is a selector cam 102—1 which operates its associated selector lever 103—1 (Fig. 1). It should be noted, as is clearly shown in Fig. 3, that cam 102—1 is positioned to the rear of a similar cam 102—2 while selector lever 103—1 is positioned behind a lever 103—2. Levers 103—1 and 103—2 are similar except near their lower ends whereat lever 103—1 extends downwardly beyond lever 103—2 for a short distance and has formed thereon a notch 104. Springs 106 tend to pull levers 103—1 and 103—2 upward and to the left as viewed in Fig. 6 on the fixed rod 107.

When the first element of a signal code combination is marking, armature 66 of selector magnet 67 moves downwardly from a position opposite notch 104 of selector lever 103—1 to block the latter from moving to the left (as viewed in Fig. 6) when cam 102—1 presents its notch 108 to the projection 109 of selector lever 103—1. As a consequence, selector lever 103—1 remains in the position shown in Fig. 6 and as the high part of cam 102—1 engages projection 109 of selector lever 103—1, the lower part of this lever will move outward with rod 107 serving as a pivot point. Pivoted about a fixed shaft 111 is an actuating lever 112—1 carrying at its lower end a pin 113 which extends through a bifurcation 114 of a floating lever 116. It is to be understood that in the present invention, actuating lever 112—1 will remain in the position assumed during reception of the previous signal code combination. Thus, if lever 112—1 had remained in the position shown in Fig. 6, it would now be moved outwardly at its lower end as the part 117 of selector lever 103—1 pressed against it. At this time lever 118 which is pivotally mounted on lever 116 by means of socket connection 119, moves to the right since pin 113 will now pivot lever 116 counterclockwise. At its free end lever 118 carries a pin 121 which is engaged in a slot 122 of a slide rack 123 mounted on pin 124, and having its teeth 126 in engagement with a pinion 127 attached to shaft 128 which supports a sleeve 125 (Fig. 2), to the front end of which is secured the type segment 101. When lever 118 moves to the right as described, its pin 121 causes slide rack 123 to be moved to the right and type segment 101 to be rotated to two thirds of its full distance for the initial rotary position in the case position now being described. As slide rack 123 moves to the right and rotates pinion 127 clockwise (as viewed in Fig. 6) a second slide rack 129, slidably mounted on pins 124 and 131 and having teeth 132 in engagement with pinion 127, moves idly to the left. In the case position now being described, slide rack 129 moves idly back and forth according to the operation of slide rack 123 but when the selector shifts to the other case position, as will hereinafter appear, slide rack 123 will move idly back and forth as rotation of the pinion 127 is accomplished by the teeth 132 of slide rack 129.

When the first element of a signal code combination is spacing, armature 66 will remain in the position adjacent the notch 104 of selector lever 103—1. Now as shaft 60 rotates, selector lever 103—1 will move to the left (as viewed in Fig. 6) as its projection 109 enters notch 108 of cam 102—1 under the influence of spring 106. As projection 133 of selector lever 103—1 moves past the edge of rod 134, the selector lever 103—1 will move upwardly under the influence of spring 106. As the high part of cam 102—1 thereafter engages projection 109 of selector lever 103—1, rod 134 will now act as a pivot point and selector lever 103—1 will be moved out to the right at the top as projection 136 of selector lever 103—1 will now engage the upper part of lever 112—1. This assumes, of course, that lever 112—1 remained in at the top from the previous signal code combination. The effect of the foregoing action would be to move lever 116 in at the bottom since pin 113 carried by lever 112—1 engages the bifurcation 114 of lever 116. Thus, lever 116 would be returned to the position shown in Fig. 6, and type segment 101 instead of being advanced in a clockwise direction would move back in a counterclockwise direction in response to a spacing impulse received by selector magnet 67.

When the second element of a signal code combination is marking, armature 66 of selector magnet 67 will move out of blocking relationship with respect to the lower end of selector lever 103—2, allowing this lever to move to the left and upwardly, as previously described in connection with selector lever 103—1. Projection 133 of selector lever 103—2 now moves around the rod 134 and as the high part of cam 102—2 engages projection 109 of selector lever 103—2, the latter lever will move to the right at the top, rod 134 acting as a pivot point. Projection 136 of selector lever 103—2 will engage the upper end of a lever 112—2 also mounted on shaft 111, and swing it out at the top (assuming it was remaining in at the top from the previous signal code combination). At its upper end, lever 112—2 carries a pin 138 which engages in the upper bifurcation 139 of lever 116 and thus as lever 112—2 moves out at the top, it will also carry lever 116 out at the top. Lever 118 by means of socket connection 119 is connected to lever 116 at such a point that when it moves out at its lower end, type segment 101 moves two thirds of its possible distance and when it moves out at the top, type segment 101 moves one third of its possible distance in the case position now to be described. Therefore, when the second element of a code combination is marking, lever 118 by means of pin 121 will push slide rack 123 to the right one third of its distance in this case position. At this time, slide rack 129 will move idly to the left a similar distance.

When the second element of a signal code combination is spacing, armature 66 will block the lower end of selector lever 103—2, causing this lever to move out at its lower end with rod 107 serving as a fulcrum as described in connection with selector lever 103—1. As projection 117 of selector lever 103—2 engages the lower end of lever 112—2 (assuming the lower end of lever 112—2 remains in from the previous signal code combination) it will be moved outward at its lower end. Since pin 138 carried by lever 112—2 is engaged in the upper bifurcation 139 of lever 116, the latter lever will move inwardly and carry lever 118 to the left thereby drawing slide 123 to the left and moving the type segment 101 counterclockwise one position.

Figure 11:
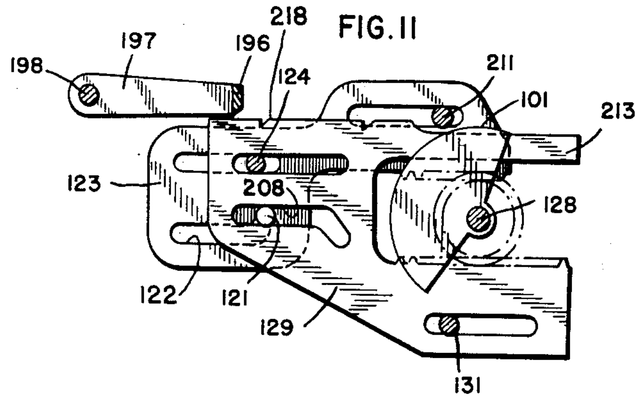
Figs. 11 to 17 show various positions of a portion of the selector mechanisms which control the initial rotary position of the type segment.
Figure 12:
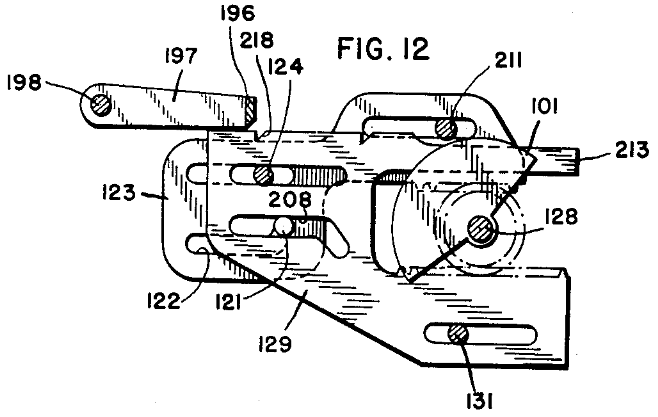
Figure 13:
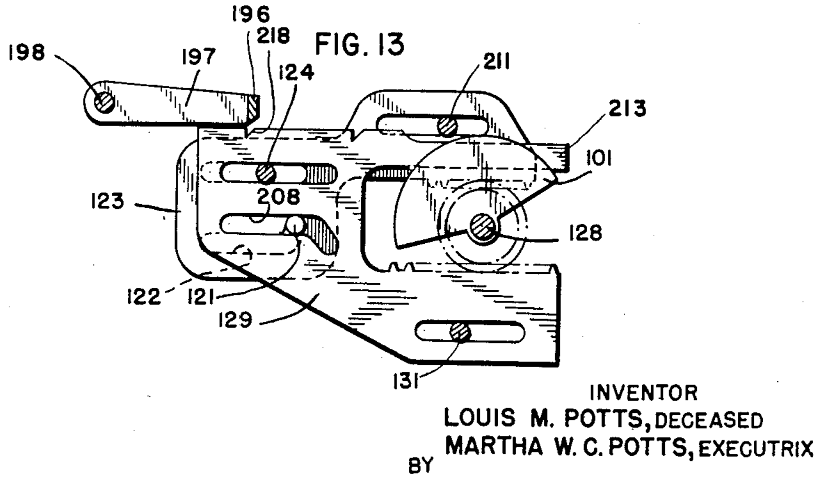

From the foregoing it is now apparent that if the first and second elements of a signal code combination are spacing, type segment 101 will remain in the position shown in Fig. 6. If the first element is spacing and the second element is marking, type segment 101 may move one third of its possible distance (Fig. 11) in this case position. If the first element is marking and the second element is spacing, type segment 101 will move two thirds of its possible distance, Fig. 12. If the first and second elements are both marking, type segment 101 will move three thirds or its full distance (Fig. 13). Thus, there are four possible initial rotary positions for type segment 101, determined by the aggregate motion produced by operation of levers 103—1 and 103—2 in response to the receipt of the first two elements of a signal code combination received by selector magnet 67.

Figure 7:
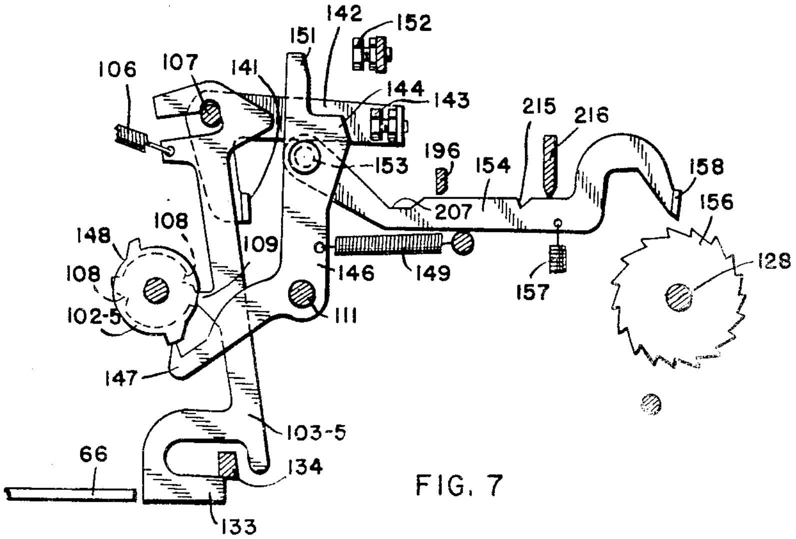
Fig. 7 is a detailed view of another portion of the type segment.

Since the fifth element of a signal code combination determines the final rotary position of type segment 101, its associated selector mechanism will be described prior to the part of the selector mechanism operable during the third and fourth element periods to control the axial position of the type segment. After the initial rotary position of the type segment 101 has been determined according to the first two signal elements, the type segment occupies an axial position determined by the third and fourth elements as will be described later. With particular reference to Fig. 7, the final rotary positioning of type segment 101 in response to the fifth impulse will now be described. In response to a marking impulse, armature 66 moves downwardly allowing projection 133 of selector lever 103—5 to move around rod 134 as previously described in connection with selector lever 103—2. The high part of cam 102—5 will push against projection 109 of selector lever 103—5, causing it to move out to the right at the top with rod 134 acting as a pivot point. When this occurs, flange 141 of bell crank 142 which is pivoted on rod 107 will be encountered, causing the bell crank 142 to pivot in a counterclockwise direction. The laterally extending arm of bell crank 142 carries an adjustable stop 143 which will at this time be lifted out of the path of an engaging surface 144 of bell crank 146. Bell crank 146 is pivoted at 111 and has a follower arm 147 which pursues the periphery of cam 148 under the urging of a spring 149. When the follower arm 147 of bell crank 146 moves toward the low part of cam 148, engaging surface 151 of bell crank 146 will engage a suitably mounted adjustable stop 152, since stop 143 was lifted out of the path of engaging surface 144 as explained. Pivoted at 153 to bell crank 146 is a relatively long stepping pawl 154 which is urged toward engagement with the teeth of ratchet 156 by means of a spring 157. Pawl 154 is equipped with a bent over frontwardly extending portion 158, so that regardless of the axial position of ratchet 156, the teeth of this ratchet may be engaged and stepped by pawl 154. Ratchet 156 is rigidly connected to the rear end of sleeve 125 mounted for a limited rotatable movement about the shaft 128 as will immediately hereinafter appear. To the front end of sleeve 125 is fixedly secured the type segment 101. A leaf spring 159 (Fig. 5) extends across type segment 101 and is rigidly clamped to shaft 128 by means of a segmental block 161. Under the aforementioned marking condition, the stroke of pawl 154 will be limited by stop 152 and ratchet 156 will be stepped one and a half teeth. This causes the flexing of spring 159 since ratchet 156 and type segment 101 are mounted on a common sleeve 125 and the type segment 101 is moved a distance corresponding to one and a half teeth of ratchet 156. Shaft 128 is at this time held against rotation, since the high parts of selector cams 102—1 and 102—2 are pressing against the projection 109 of selector lever 103—1 and 103—2 and by means of slide rack 123, pinion 127 is held in the position selected during the first two impulses.

However, when the fifth element of the code combination is spacing, armature 66 will block the lower end of selector lever 103—5 and the latter lever will be moved outwardly to the right at its lower end. This action is insufficient to raise stop 143 out of the path of engaging surface 144 and consequently when bell crank 146 pivots counterclockwise, the stroke of pawl 154 will now be shorter and will advance ratchet 156 only one half of a tooth. Again spring 159 will flex but not as much as when ratchet 156 is stepped one and one half teeth.

In order that the foregoing explanation may be more clearly understood, reference should be had to the schematic illustration of type segment 101 shown in Fig. 32. Numeral 1 represents the position occupied by type segment 101 when the first two signal impulses are spacing and the type segment 101 remains in its zero position as described. Numeral 2 represents the position occupied by type segment 101 when it is stepped one third of its possible distance. Numeral 3 represents the position occupied by type segment 101 when it is stepped two thirds of its distance. Numeral 4 represents the position occupied by type segment 101 when it is stepped three thirds or its full distance. From any of the positions just mentioned, the type segment 101 may be stepped during the fifth impulse either one half step to a character row 5 or one and a half steps to a character row 6.

The axial positioning of type segment 101 in response to the third and fourth signal elements of a signal code combination will now be described. Since the mechanism for positioning the type segment 101 axially is substantially the same as the mechanism responsive to the first two impulses, it is felt that a detailed description of its operation is unnecessary. It appears sufficient to state that according to the operation of levers 112—3 and 112—4 by their respective cams 102—3, 102—4 (Fig. 9) lever 163 (equivalent to lever 116) will remain where it is or be moved one, two, or three positions depending on the signals received for the third and fourth signal elements. Lever 163 pivotally supports one end of lever 164 (equivalent to lever 118) which is pivotally connected at its other end at 165 to a slide rack 166, slidably mounted on pins 167 and 168. Near the right end of slide rack 166 (Fig. 2) is a rearwardly extending projection 169 having teeth 171 in engagement with pinion 172 which is fast to a stub shaft 173. Shaft 173 carries a second pinion 174 which engages a slidable rack 176 normally urged toward the rear of the apparatus by a suitably attached spring 177. Rack 176 has integrally formed thereon a pair of projections 178 which straddle a part of the ratchet 156 which was previously described. Thus, according to the third and fourth impulses received by selector magnet 67, rack 176 may remain in the position shown in Fig. 2 or be moved one, two, or three positions and carry with it the ratchet 156, sleeve 125, and type segment 101. Therefore, either row 181, 182, 183, or 184 of type segment 101 may occupy a position beneath hammer head 186 of type hammer 187.

At the beginning of each revolution of shaft 60, cam 188 presents one of its high parts to a resetting bail 189 which is pivoted at 191 and urged to an upward position by spring 192. This will cause a bent over flange 193 of bail 189 to restore the levers 103—1 to 5 which have moved around rod 134 to their original positions ready for receipt of the next signal code combination. At this time type segment 101 may move back to the axial position shown in Fig. 2 under the influence of spring 177. Spring 159 (Fig. 5) will become unflexed and type segment 101 may move back in a rotary direction one half or one and one half steps according to the manner in which it was stepped for the fifth element of the previous signal code combination. However, the type segment 101 will remain in the initial rotary position occupied during the previous signal code combination.

Thus far, the selector mechanism has been described in connection with the figures case position as shown schematically in Fig. 32. A description will now be given of the manner in which case shifting operations are performed to move the type segment 101 from the figures to the letters position and back to the figures position.

Figure 8:
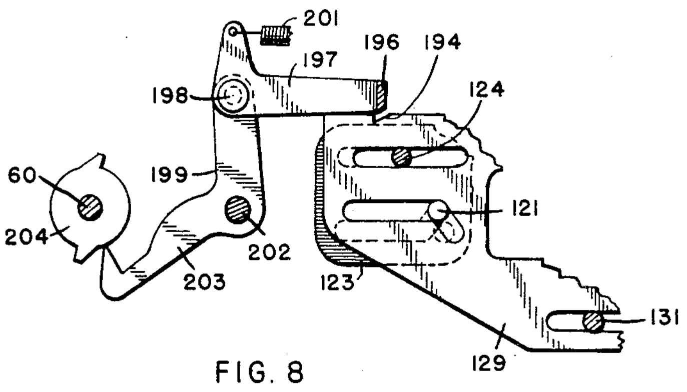
Fig. 8 illustrates a case shifting operation.
Figure 14:
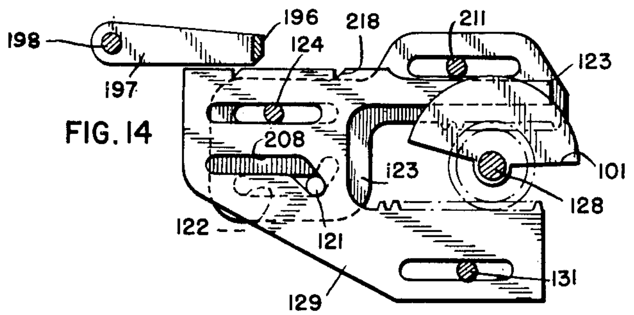

It will be assumed that the type segment 101 has been operating in the figures or shift position and it is now desired to shift to the letters or unshift position. When the unshift or all marking signal is received, slide rack 123 (Fig. 8) will be moved to the left in a position with its notch 194 directly underlying cross piece 196 of a bail 197, which is pivoted at 198 on bell crank 199 and urged clockwise by spring 201. Bell crank 199 in turn is pivoted at 202 and has an arm 203 which pursues the periphery of cam 204 carried by shaft 60. At this time, the low part 206 of slide rack 166 is also directly below cross piece 196 of bail 197. Further, at this time low part 207 of slide rack 154 (Fig. 7) is also directly below cross piece 196 of bail 197. Under the afore-described conditions cross piece 196 of bail 197 drops into notch 194 of slide rack 123. At the start of the next succeeding half revolution of shaft 60, follower 203 of bell crank 199 will ride up the high part of cam 204 and by means of bail 197 will draw slide rack 129 to the left, to the position shown in Fig. 14 which is the letters or unshift position. As will be noticed by an inspection of Fig. 14, pin 121 of lever 118 is cammed out of the high part of slot 122 of slide rack 123, into the low part of slot 208 of slide rack 129. When slide rack 129 moves to the position shown in Fig. 14, a latch 209 pivots clockwise as viewed in Fig. 6 about shaft 211 and a forwardly extending flange 212 drops over the part 213 of slide 129 to hold slide 129 in the letters position. This is necessary since there is now a tendency of spring 214, interconnected to levers 116 and 118, to contract and thereby cause pin 121 to push slide 129 to the right and move type segment counterclockwise.

Figure 15:
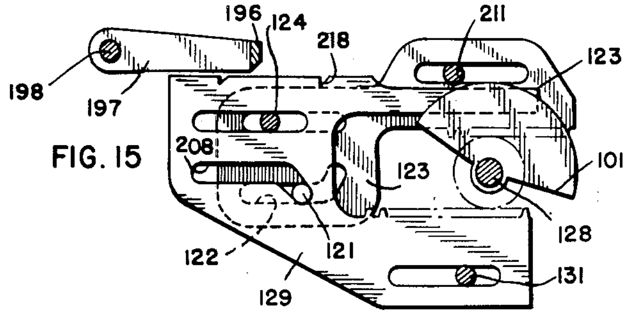
Figure 16:
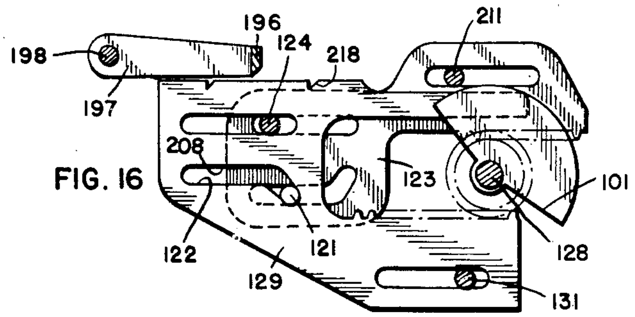
Figure 17:
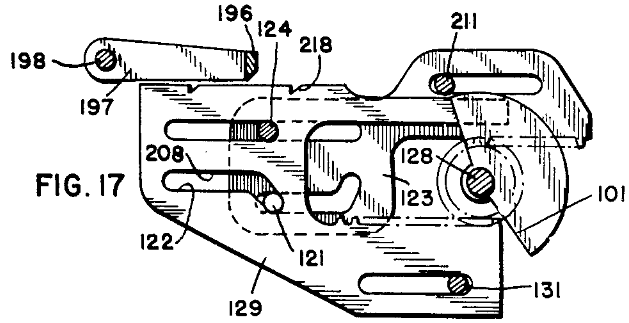

With type segment 101 in the letters or unshift position, lever 116 will work oppositely to the manner in which it worked in the figures or shift position, since pin 121 is now in effective engagement with slot 208 of slide rack 129. Now, in response to spacing impulses received in either of the first two signal elements of a signal code combination, lever 118 will pull slide 129 further to the left and rotate type segment 101 further in a clockwise direction to one of the positions shown in Figs. 15, 16, and 17. Thus, in the letters or shift position, there are again four possible initial rotary positions including the position shown in Fig. 14, in which the first two impulses would be marking and the type segment 101 would not move during receipt of the first two impulses. Again the type segment will be driven to its final position according to the nature of the fifth signal impulse of a code combination.

On receipt of the shift signal (the third element of the code spacing), cross piece 216 of a bail 217 which is pivoted at 211 will be opposite notch 218 of slide 129, notch 215 of pawl 154 and notch 221 of slide 166, allowing cross piece 216 of bail 217 to fall into the alignment of notches. As a result, when bail 217 pivots counterclockwise, its projection 220 will engage flange 219 of latch 209 and pivot this latch also counterclockwise. This raises flange 212 out of the path of part 213 of slide rack 129, enabling spring 214 to return the type segment 101 to the figures or shift position as pin 121 is cammed once more to the upper part of slot 122 of slide rack 123. It will be noted that latch 209 and bail 217 are connected by means of a tensioned spring 222 which tends to pivot members 209 and 217 in opposite directions.

Figures 9, 10:
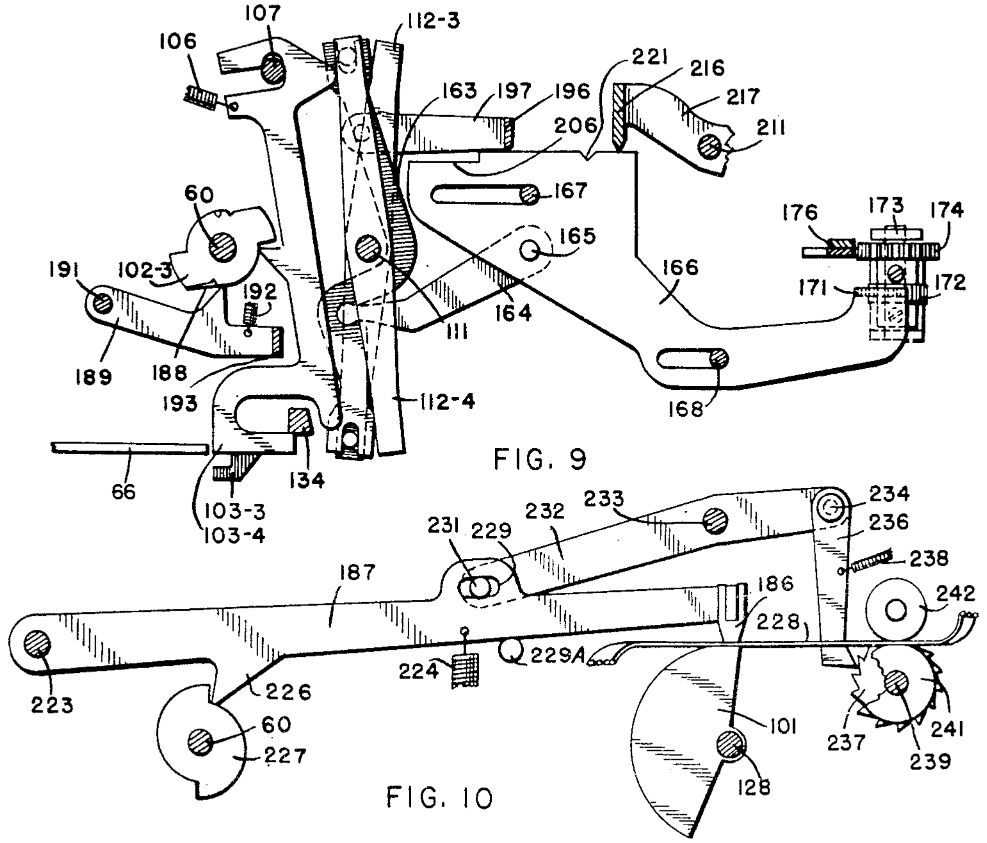
Fig. 9 is a detailed view of a part of the selector mechanism which controls the axial position of the type segment.
Fig. 10 illustrates the print hammer and tape feeding mechanisms.

Operation of print hammer 187 will now be described with particular reference to Fig. 10. Print hammer 187, which carries at its free end hammer head 186, is pivoted at 223 and normally urged in a clockwise direction by means of spring 224. Just at the end of a half revolution of shaft 60, after type segment 101 has been moved to its selected position, follower projection 226 drops to the low part of cam 227 and a printing impression is made on tape 228 by hammer head 186. Stop 229A may be of resilient material so that print hammer 187 returns with a quick rebound and leaves a sharp, clear impression on tape 228.

As printing hammer 187 operates, it also causes the operation of the tape feeding means in a manner now to be described. Print hammer 187 is slotted at 229, at which point it is engaged by a pin 231 carried by a tape feeding lever 232 which is pivoted about rod 233. The opposite end of lever 232 has pivoted thereto at 234, a tape stepping pawl 236 which is urged into engagement with the teeth of ratchet 237 by means of spring 238. Ratchet 237 is fast to a shaft 239 which also carries a pressure roller 241 which cooperates with an idle pressure roller 242 to feed the tape 228. When print hammer 187 moves down, as explained, lever 232 pivots counterclockwise and raises pawl 236 up into engagement with a tooth of ratchet 237. When print hammer 187 returns to its upward position, pawl 236 will move down and advance a section of tape 228 into printing position.

The transmitter is best disclosed in Figs. 1 and 2, and with particular reference to these figures the operation thereof will be described. At the front of the apparatus is the keyboard 35 which comprises a series of key levers 251 mounted about a common pivot rod 252 and individually urged in a counterclockwise direction (as viewed in Fig. 1) by means of springs 253. An inspection of Fig. 1 will show that key levers 251 extend beyond the pivot rod 252 toward the rear of the machine whereat the levers terminate in beveled locking edges 254 designed to be engaged by the cross piece 256 of a locking bail 257 which is mounted for pivotal movement on pivot studs 258 located at either side of the apparatus. Also mounted for pivotal movement about rod 252 is a universal bail 261 whose cross piece 262 underlies all of the key levers 251.

Universal bail 261 includes a rearwardly extending arm 263 having a hook shaped latching finger 264 which cooperates with latch arm 266 of a latching bail 267 which is pivoted on studs (only one of which is shown in the drawings) 268 and has an integrally formed and rearwardly extending follower arm 269 whose follower piece 271 rides upon the periphery of a cam 272. A spring 273 urges latching bail 267 in a clockwise direction (as viewed in Fig. 1) to insure the engagement of its follower piece 271 with the periphery of the cam 272. Arm 263 of universal bail 261 also has formed thereon a projection 274 which is designed to engage a pin 276 carried by an arm 277 of locking bail 257. At the other side of locking bail 257 is carried an arm 278 (Fig. 4) which supports a pin 279 designed to operate the contact pile-up 281. The resilience of the springs associated with contact pile-up 281 urges bail 257 in a counterclockwise direction as viewed in Fig. 4. In order that the circuit may not drop over from telegraph to telephone condition, as will become more apparent later in the description, a dash pot 280 is connected to contact pile-up 281 by means of a lever 285 which is pivoted at 290. Thus for brief pauses in transmission of telegraph signals on operation of the keys, contact pile-up 281 may remain in its up position due to the retarding effect of dash pot 280 but will automatically move down after a certain time interval has elapsed. Universal bail 261 includes a rearwardly extending arm 282 (Fig. 4) which controls the operation of contact pairs 283—1 and 283—2. The lower part of a cam 284 (Fig. 1) is engaged by a follower lever 286 which is pivoted at 287 and controls the operation of a contact pile-up 288.

From the foregoing description it can now be readily understood that when a key lever 251 is depressed, universal bail 261 will pivot clockwise (Fig. 1) and its latching finger 264 will engage latch arm 266 of latching bail 267 controlled from cam 272. As follower piece 271 rides to a low part of the periphery of cam 272, universal bail 261 will become latched up. Pivotal movement of universal bail 261 will further result in the engagement of pin 276 of locking bail 257 which is effective to enable the cross piece 256 of the later bail to move against the beveled edges 254 of the key levers and lock the selected key lever 251 in its selected position and the remaining key levers in their unselected position. It is apparent also, that at this time contact pile-up 281, contact pairs 283—1 and 283—2, and contact pile-up 288 will be operated. When follower piece 271 rides again to a high part of cam 272, the various parts which were locked up will be automatically released.

Figures 19, 20, 21:
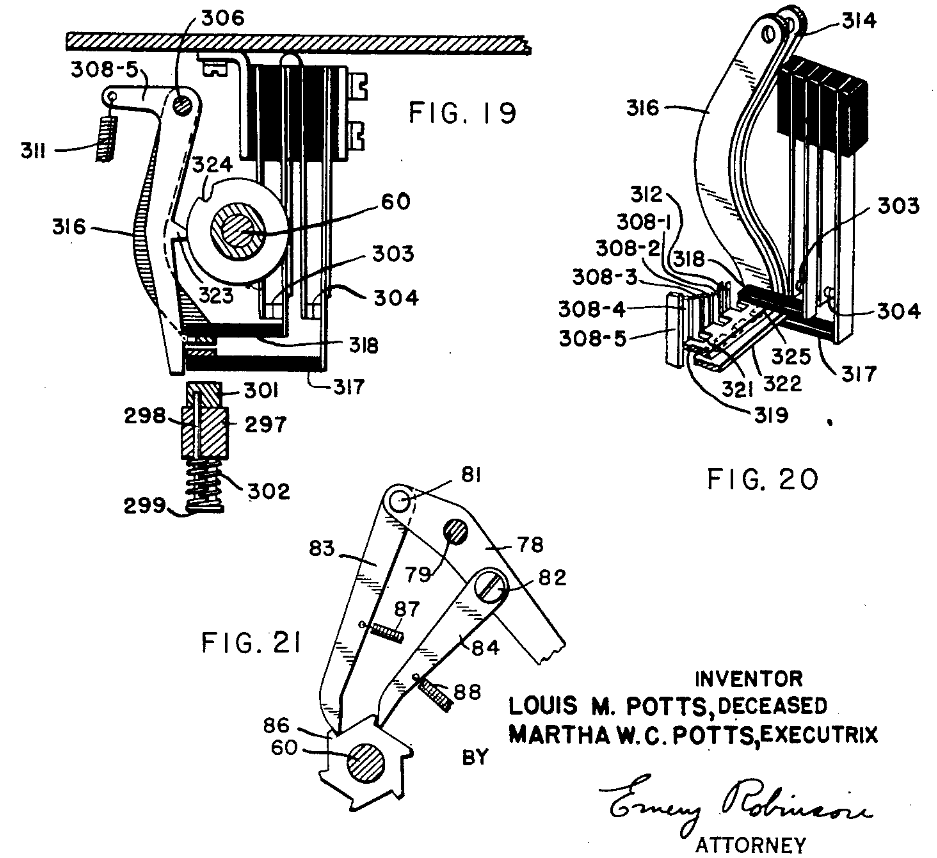
Figs. 19 and 20 are detail views of the transmitting contacts.
Fig. 21 is a detail view showing particularly the stepping pawls which are operated by the vibrating motor.

Pivotally mounted on studs 289 are a series of interleaved levers 291 having a tail pieces 292 resting against a stop member 293. The cross pieces 294 of levers 291 are notched at their bottom portions 296 in permutation code for selective engagement by key levers 251. Above cross pieces 294 of levers 291 are slidably mounted, in a block 297, a series of pins 298 which have formed thereon at their lower ends, heads 299 and which carry at their upper ends individual blocking elements 301. As best seen in Fig. 19 the pins are placed in staggered positions and are normally urged downward by associated compression springs 302. Thus, according to the particular key lever 251 which is operated, certain selected blocking elements 301 may be raised up from the position shown in Fig. 19 by associated selected levers 291 which present full rather than notched surfaces to the selected key lever 251.

The function of blocking elements 301 is to control the operation of transmitting contacts 303, 304 (Fig. 19) in a manner now to be described. Pivotally mounted on a stud shaft 306 (Fig. 2) projecting from a rear supporting member 307 are a series of transmitting levers 308—1 to 308—5 which are urged into engagement with individual transmitting cams 309—1 to 309—5 by springs 311. Also mounted on stud 306 is a start stop transmitting lever 312, which by means of its spring 311 is urged into engagement with an associated start-stop transmitting cam 313. Further, stud 306 carries a pair of contact operating bails 314 and 316 (Fig. 20), which respectively operate transmitting contacts 303 and 304 by means of insulated connections 317 and 318. Transmitting contacts 303 are designed to be operated for the start-stop, the second and fourth impulses of a signal code combination, while transmitting contacts 304 are designed to be operated for the first, third, and fifth impulses. Cross piece 319 of bail 316 is suitably notched at points 321 to permit entry of levers 312, 308—2 and 308—4. Cross piece 322 of bail 318 is provided with similar notches 325 offset with respect to notches 321 which permit entry of levers 308—1, 308—3, and 308—5. Such entry into the notches of their associated bails 314 and 316 is made possible when projections 323 of transmitting levers 308—1 to 308—5 and 312 sense the notches 324 of cams 309—1 to 309—5 and cam 313 if unblocked by blocking elements 301. However, there is no blocking element 301 for start-stop transmitting lever 312. It is now believed clear that upon the operation of a particular key lever 251 a permutation code will be established in blocking elements 301 and contact operating bails 316 and 314 will accordingly operate the transmitting contacts 303 and 304.

The telephone apparatus 31 includes a cradle 326 (Fig. 1) which is mounted on top of the unit and upon which rests the telephone handset 327.

Through cradle 326 extends a long plunger pin 328, the lower end of which is in engagement with a contact bank 300. The weight of handset 327 normally retains contact bank 300 in its downward position. When the handset is removed from the cradle, contact bank 300 will automatically move to its upward position.

Figure 24:
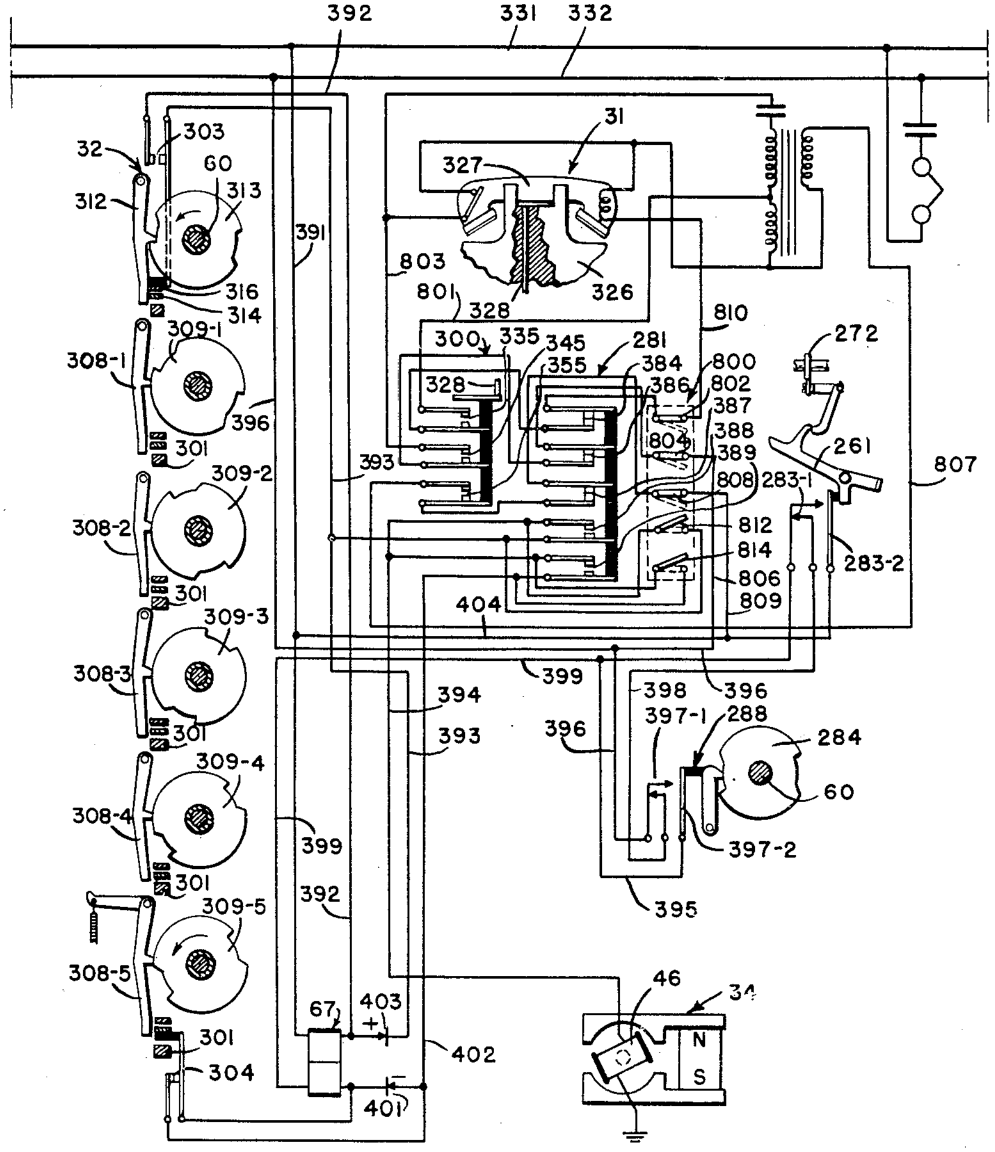
Fig. 24 is a schematic circuit illustration of a subscriber's station.

With the circuit drawings arranged according to the plan illustrated in Fig. 30, operation of the exchange sender circuit will now be described prior to the operation of the subscriber's station (Fig. 24). It is to be understood, that when a transmitting operation is to take place, telephone handset 327 is lifted from the cradle 326 and the operator waits for the dial tone which indicates that a connection has been made to an idle modified sender circuit at the exchange such as disclosed in Figs. 25, 26, and 27.

Incoming lines 331 and 332 from the subscriber's station shown in Fig. 24 are respectively connected with the upper and lower winding of a double wound relay 333 (Fig. 25) at the exchange through the usual switching equipment at the exchange. A lead 334 extends from the windings of relay 333, through normally closed contact 336 operable from cam 337 to positive battery, and through normally open contact 338 (when closed) controlled from cam 339 to negative battery. The operation of contacts 336 and 338 and double wound relay 333 will be explained in detail later. However, it might be mentioned at this time that cam 337 has high parts which function during the stop impulse, and the first, third, and fifth impulses whereas cam 339 has high parts which function during the start pulse, and second and fourth pulses. This provides a constant current reversal over the line for operation of selector magnet 67 and motor 34. Cams 337 and 339 are mounted on a sleeve 341 about a constantly rotating shaft 342 which is synchronized with shaft 60 at the subscriber's station. However, shaft 342 makes one complete revolution for each signal code combination whereas shaft 60 at the subscriber's station makes only one half of a revolution for each signal code combination. Also mounted on sleeve 341 is a cam 343 which controls contacts 344 and a clutch control cam 346 which is under the control of clutch magnet 347.

When double wound relay 333 becomes unbalanced due to an open line condition over either incoming line 331 or 332 in a manner to be later explained, armature 348 will be attracted resulting in an obvious circuit over conductor 349 and through contact 344 to clutch magnet 347. Attraction of armature 351 by clutch magnet 347 releases sleeve 341 for rotation as in conventional start-stop practice.

As incoming signals are repeated by double wound relay 333, they are retransmitted by means of a series of transmitting cams 352—1 to 352—5 also carried by sleeve 341 to associated double wound storage relays 353—1 to 353—5 as follows: From ground, through armature 348, over conductor 349, through closed transmitting contact 354—1 (as an example), over conductor 356, through the left winding of storage relay 353—1, and over conductor 357 to grounded battery. When storage relay 353—1 becomes energized it picks up a locking circuit through its right-hand winding extending through armature 358—1 and over conductor 359 through closed contact pair 361 to ground. Contact pair 361 is under the control of a cam 362 also carried by cam sleeve 341. Thus according to the operation of transmitting contacts 354—1 to 354—5, storage relays 353—1 to 353—5 will be operated to store a permutation code. It is understood, of course, that only when armature 348 of double wound relay 333 is attracted will an impulse be transmitted through a particular contact 354—1 to 354—5 and that such impulses will be properly timed with respect to the apices 363 of cams 352—1 to 352—5.

Figure 26:
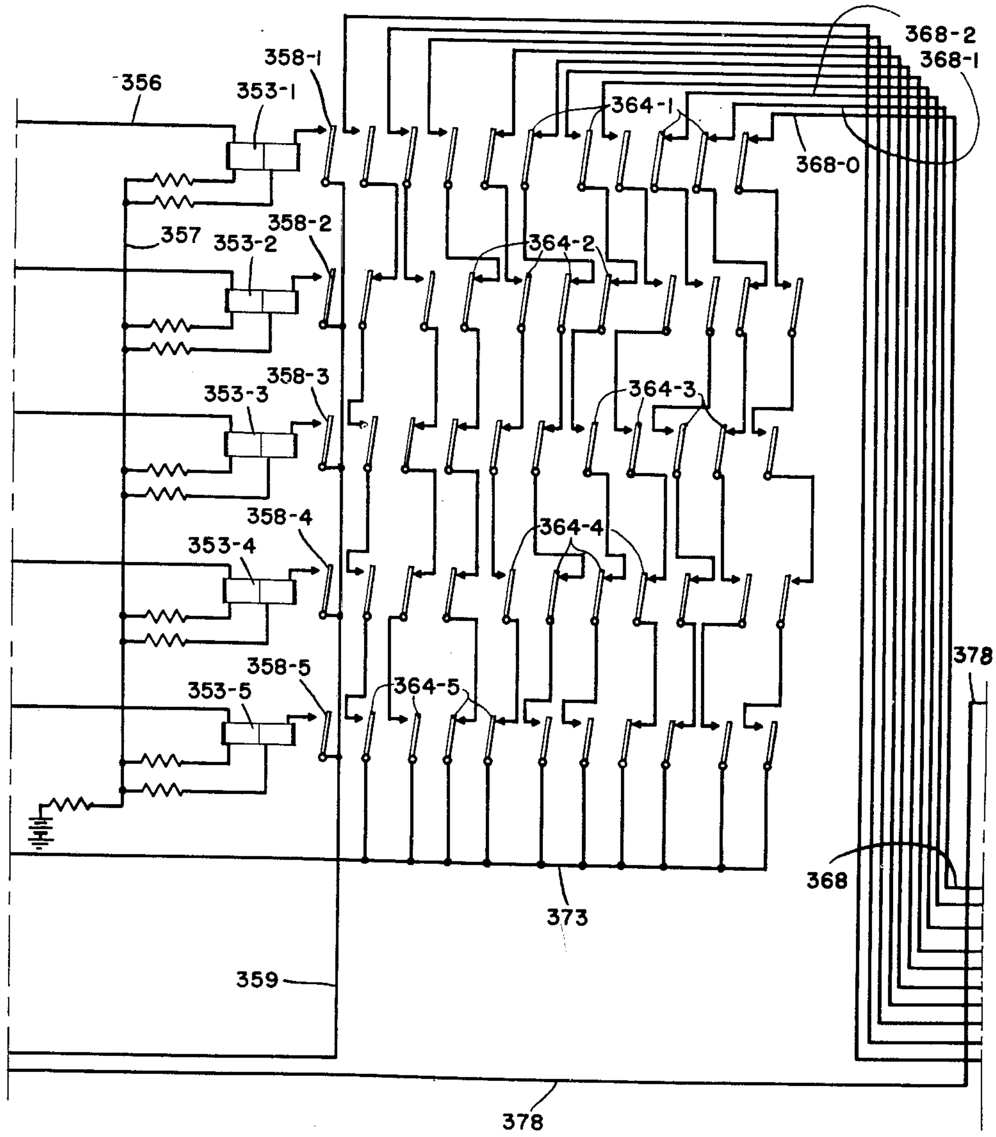
Figure 27:
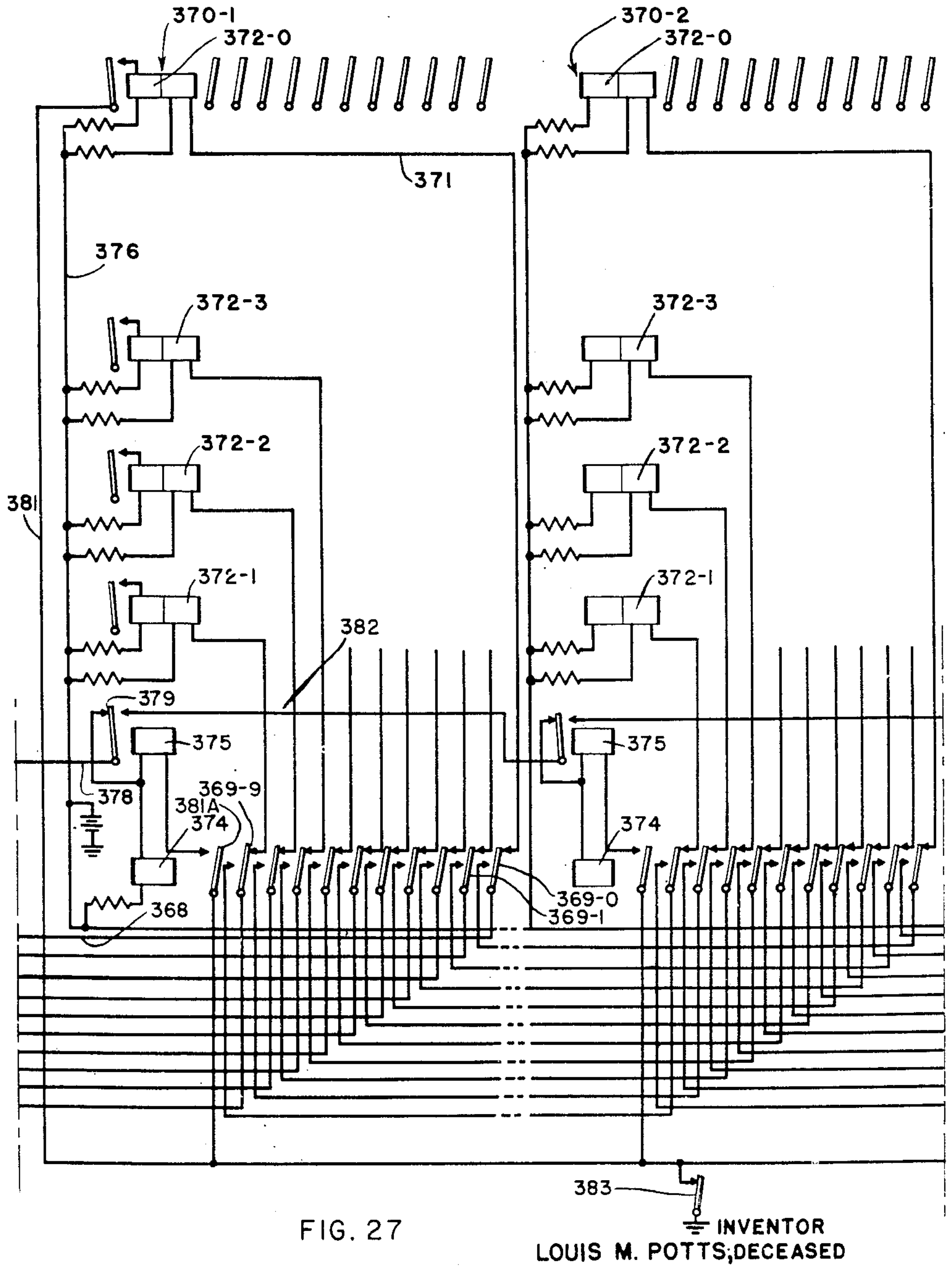

The storage relays 353—1 to 353—5 are provided with individual contacts 364—1 to 364—5 representative of the 0–9 digits, reading from right to left in Fig. 26. In Fig. 27 are shown two sets of counting relays 370—1, 2 which register the circuit set up by the storage relays 353—1 to 353—5. In ordinary telephone dial practice there are seven sets of counting relays which are representative of the usual three alphabetical designations and four numerical digits. It is, therefore, understood that actually five more sets of counting relays would be provided but it is deemed unnecessary to disclose a complete system herein since counting relay circuits of this type are commonly used in telephone systems.

Let it be assumed that the first character key depressed at the calling subscriber's station is the letter "Z" which is the same on standard telephone dials as the zero digit. When this occurs relays 353—1 and 353—4 are de-energized and relays 353—2, 353—3, and 353—5 are energized. Just after reception of the fifth impulse of a signal code combination by relays 353—1 to 353—5, contact 366 is closed momentarily by its cam 367 and a circuit is made through the extreme right-hand contacts 364—1 to 364—5 of relays 353—1 to 353—5 for the zero relay 372—0 of the first set of ten counting relays 370—1 as follows: Through contact 366, over conductor 373, through the right-hand contacts 364—1 to 364—5 of relays 353—1 to 353—5, over conductor 368—0 through contact tongue 369—0 of counting control relay 374, over conductor 371, through the right-hand winding of zero relay 372—0 and over conductor 376 to battery. Relay 372—0 locks up through its left-hand winding over an obvious circuit provided to conductor 381. It is to be noted that there are a pair of counting control relays 374, 375 associated with each set of counting relays 370—1, 370—2.

Just before cam sleeve 341 comes to rest, cam 362 functions to open the locking circuit for relays 353—1 to 353—5 extending through contact 361 and also generates a pulse for transferring a setting from counting relays 370—1 to 370—2 as follows: Through closed contact 377, over conductor 378, through closed contact 379 of counting control relay 375 and through the winding of counting control relay 374 to battery. As relay 374 becomes energized it attracts all its tongues 369—0 to 369—9 and locks up through its contact tongue 381A over an obvious circuit which extends through both relays 374 and 375. As relay 375 operates, it attracts its contact tongue 379. Thus the next conductor 368—0 to 368—9 chosen by relays 353—1 to 353—5 will operate a selected relay 372—0 to 372—9 in the second set of counting relays 370—2, and a pulse subsequently received over conductor 378 will now be transferred to conductor 382 and will operate control relays 374 and 375 associated with the second set of counting relays 370—2 as was previously done in connection with the first set of counting relays 370—1. These cycles would continue until all seven sets of counting relays were conditioned at which time the desired telephone connection would be made as in usual telephone practice. At this time, tongue 383 would open, releasing all the counting relay circuits, by means not shown, but according to standard telephone practice. It is, of course, understood that additional standard switching equipment would be provided with the sender circuit to establish a connection between the calling and called subscribers over a circuit to be hereinafter described.

Figures 25, 30:
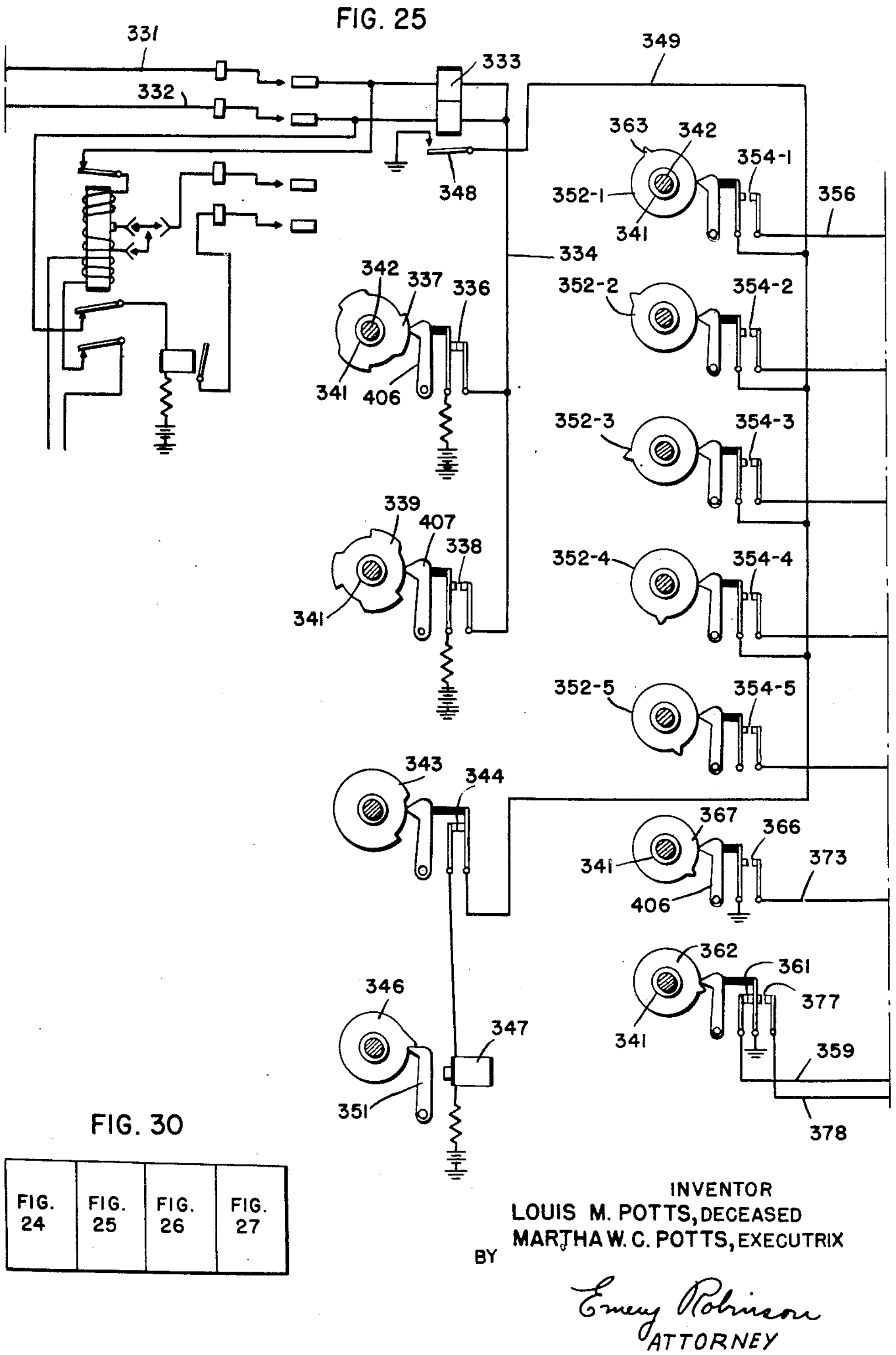
Figs. 25 to 27 illustrate the exchange sender circuit employed in the present invention.
Fig. 30 shows how the drawings are arranged when a subscriber is connected to the exchange sender circuit.

Now that the operation of the exchange sender circuit has been explained, reference should be again had to the drawings arranged according to the plan shown in Fig. 30 with particular emphasis on Figs. 24 and 25 for description of the subscriber station. It should be remembered that plunger 328 is normally holding contact bank 300 in its lower position. To initiate a call the subscriber removes the handset from the cradle in the usual manner. Contacts 335, 345, 355 of bank 300 now close and provide the usual telephonic circuits. The circuit for lead 801 now extends through contact 335, contact 384 of pile-up 281, contact 802 of switch 800 and over lead 810. The circuit for lead 803 extends through contact 345, contact 386 of pile-up 281, contact 804 of switch 800 to lead 806. The circuit for lead 807 extends through contact 355, contact 387 of pile-up 281, and contact 808 to lead 809. These circuits provide the usual subscriber telephone connections. When the dial tone is heard, it is known that the calling subscriber is connected according to usual telephone practice to the exchange sender circuit described above.

Upon receipt of the dial tone, the key having the first alphabetical designation of the called subscriber is depressed. Depression of a key lever 251 operates universal bail 261 and the key lever becomes locked up for the duration of a signal code combination as previously described. At this time contacts 384, 386, and 387 of pile-up 281 will open while contacts 388 and 389 will close. This takes the telephone set out of circuit and establishes the telegraph set in circuit over lines 331, 332. It should be remembered that contact 336 associated with cam 337 at the exchange is closed and positive current is passed through both windings of double wound relay 333. One circuit extends over line 331, over conductors 391, through the upper winding of selector magnet 67, through positive rectifier 403, over conductor 393, through contact 388 of pile-up 281, over conductor 394, and through the winding 46 of vibrating motor 34 to ground. Another circuit extends over line 332, over conductor 396, through contact 397—1 of pile-up 288, over conductor 398, through contact 283—1, over conductor 399, through the lower winding of selector magnet 67, through closed transmitting contact 304 to lead 402, through closed contact 389 of pile-up 281 and over conductor 394 and through the winding 46 of vibrating motor 34. A negative rectifier 401 is provided for the lower winding of selector magnet 67 but the circuit for the lower winding of selector magnet 67 extends at this time through closed transmitting contact 304. In other words, negative rectifier 401 is at this time shunted out of circuit. However, negative rectifier 401 could not pass current anyway at this time since positive potential is now being supplied from the exchange from contact 336.

As universal bail 261 is operated upon depression of a key lever 251, make-before-break contacts 283—1 and 283—2 operate and relay 333 becomes unbalanced as the circuit previously extending over line 332 to the lower winding of relay 333 becomes opened due to the opening of contact 283—1. The upper winding of selector magnet 67 receives current as before. However, a substitute circuit may be now traced through the lower winding of selector magnet 67 as follows: From positive current extending over conductor 331, over conductors 391 and 404, through contact 283—2 (now closed), over conductor 399 and through the lower winding of selector magnet 67, through closed contact 304 to lead 402, through contact 389, over conductor 394 and through the winding 46 of vibrating motor 34.

As relay 333 at the exchange becomes unbalanced it attracts its armature 348 and operates clutch magnet 347 to release cam sleeve 341 for rotation as explained. It should be mentioned that as sleeve 341 rotates, cam 343 opens contact 344 and breaks the circuit for clutch magnet 347 so that lever 351 will be in a position to stop sleeve 341 after each revolution. As sleeve 341 rotates, follower 406 associated with positive contact 336 moves to a low part of its cam 337 and opens this contact. At this time, cam 339 by means of one of its high parts engages follower 407 to close negative contact 338. Negative current is now provided for both windings of relay 333 and over lines 331, 332 to the calling subscriber's station. It should be remembered that rectifier 403 associated with the upper winding of selector magnet 67 is positive and that transmitting contact 303 is open. Therefore, only the lower winding of magnet 67 passes current at this time and selector magnet 67 attracts its armature 66 to release vibrating motor 34 as explained in an earlier part of the description.

As shaft 60 starts to rotate, make-before-break contact pile-up 288 is immediately operated, which is effective to provide a circuit for line 331 through the upper winding of selector magnet 67 as before and a separate circuit for line 332 is made through the lower winding instead of both windings receiving current over the single line 331 as previously described. The new circuit is made as follows: Over line 332, over conductor 396, through contacts 397—2 of contact pile-up 228 (now operated) over conductors 395, 399, through the lower winding of selector magnet 67 and through both negative rectifier 401 and closed transmitting contacts 304 to the circuit previously described as extending through the winding 46 of vibrating motor 34. At the end of the negative start pulse provided by contact 338 at the exchange, this contact will open and positive contact 336 will close to provide the impulse for the first element of a signal code combination. These current reversals over lines 331, 332, provide the necessary current reversals for winding 46 of vibrating motor 34 to keep it in motion. It should be noted then that this current is used both for signal purposes and for vibration of motor 34.

With positive potential now provided for the first impulse, it can be seen that if blocking element 301 prevents operation of transmitting contact 304 which functions for the first, third, and fifth impulses, contact 304 will remain closed and selector magnet 67 will remain balanced resulting in a spacing signal since the effect of closure of transmitting contact 304 is to throw a shunt across negative rectifier 401. It is obvious then, if blocking element 301 does not move up to block operation of contact 304 it will be opened and since positive current cannot pass through negative rectifier 401, selector magnet 67 becomes unbalanced, line 332 is opened, and a marking signal is sent on the line. This would unbalance relay 333 at the exchange, and since cam sleeve 341 at the exchange is synchronized with operation of shaft 60 at the substation, cam 352—1 would close its contact at this time and thereby energize relay 353—1 as previously explained. During the second impulse, which is a negative impulse period, as current is again furnished through negative contact 338, if transmitting contact 303 shunts positive rectifier 403, selector magnet 67 will be balanced. However, if transmitting contact 303 is opened selector magnet 67 will attract its armature 66, since positive rectifier 403 cannot pass the negative potential.

After cam 309—5 operates for the fifth impulse period, the vibrating motor 34 will be locked up by stop lever 57 (Fig. 18) as previously explained. At this time start stop lever 312 drops into the front part of notch 324 of cam 313 and transmitting lever 308—5 rides to the high part of cam 309—5 as seen in Fig. 24. Further, at this time contact pile-up 288 again assumes the position shown in Fig. 24 as rotation of shaft 60 ceases. Again positive potential is provided over line 331, as explained earlier, for both windings of selector magnet 67 and vibrating motor 34 remains at rest.

It should be noted that according to the present invention marking is represented by the energization of only one winding of selector magnet 67, whereas spacing is represented by the energization of both windings of selector magnet 67 or, in other words, when the magnet is magnetically balanced.

Figure 31:
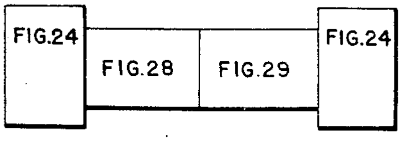
Fig. 31 shows how the drawings are arranged when a subscriber is connected to another subscriber by means of the modified district selector and incoming trunk circuits.
Figure 28:
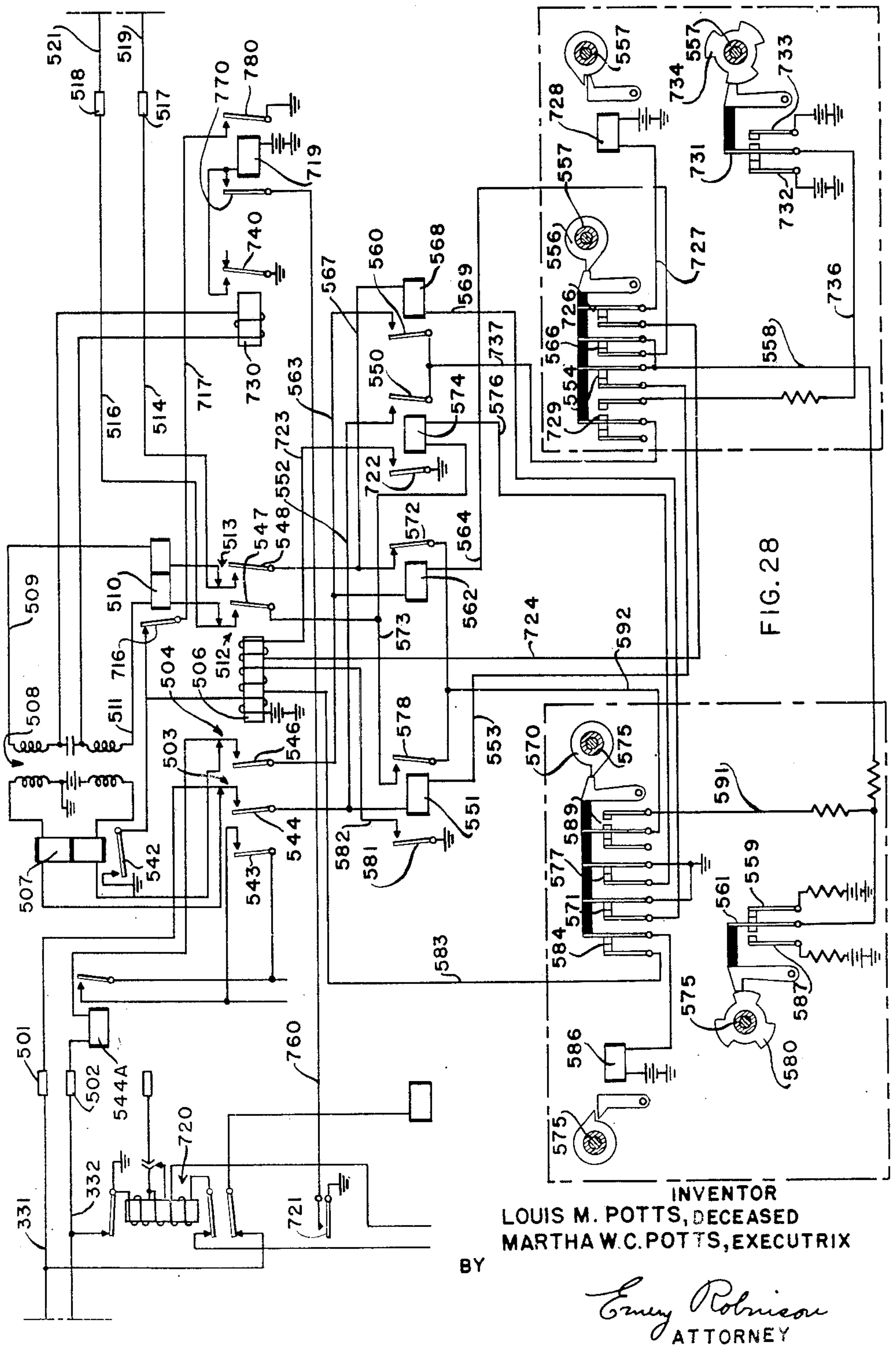
Fig. 28 shows a modified telephone district selector circuit.
Figure 29:
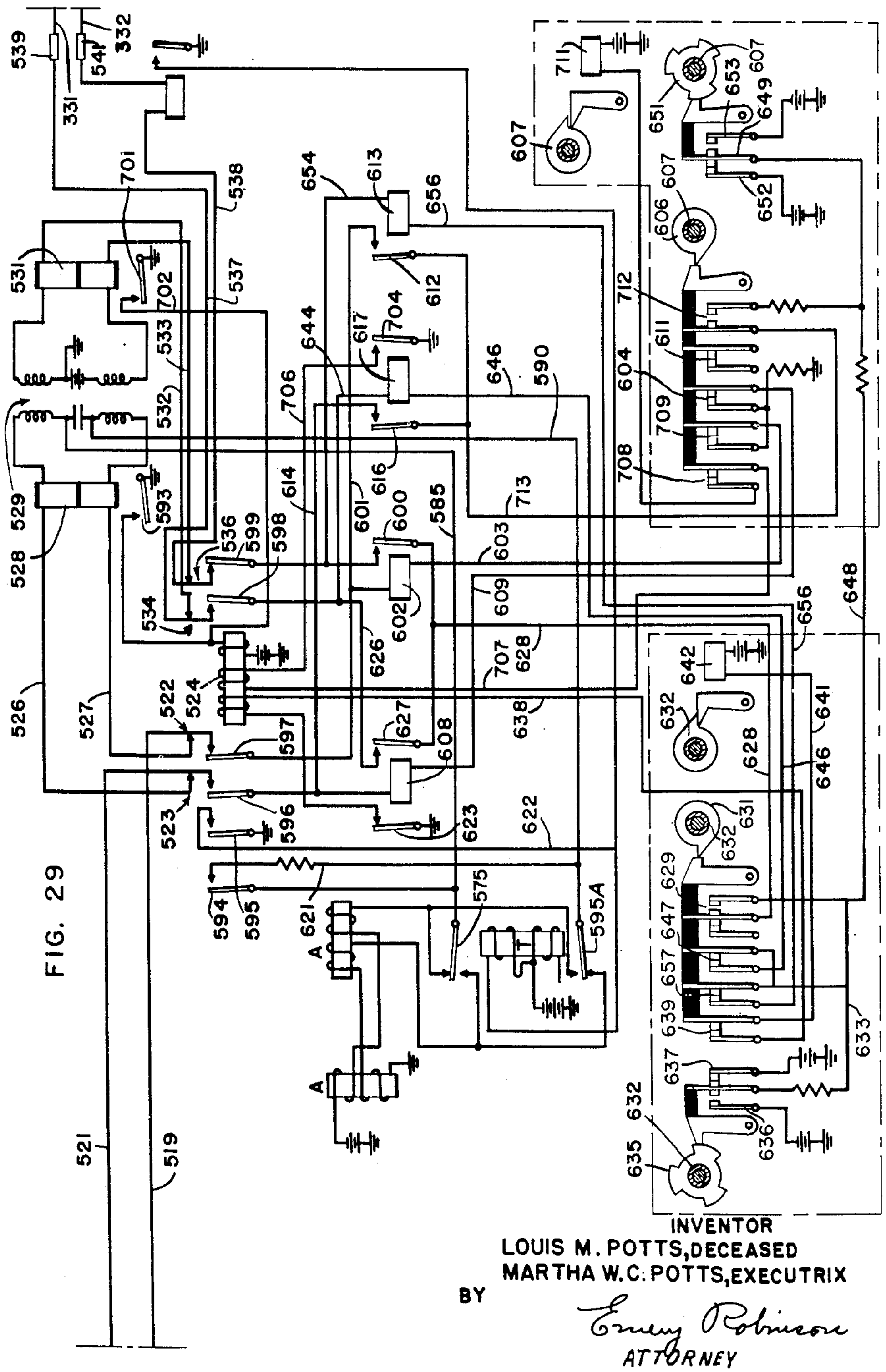
Fig. 29 shows a modified telephone incoming circuit.

By means of additional standard switching equipment provided with the sender circuit, a telephone circuit is now established between two subscribers which it will be assumed are at an east and west subscriber's station, according to the placement of the drawings shown in Fig. 31. Fig. 28 represents a modified district selector circuit while Fig. 29 illustrates a modified incoming circuit. Both of the just mentioned circuits are standardized parts of telephone switching equipment except as modified by the present invention.

The subscriber at the west station may now talk to the subscriber at the east station by means of a circuit extending from leads 331, 332, through tip and ring connections 501, 502, through make-before-break contacts 503, 504 of a slow-to-release relay 506, through the windings of double wound relay 507 to the left side of the telephone repeater 508. From the right side of repeater relay 508, over leads 509, 511, through the windings of relay 510, through make-before-break contacts 512, 513 of relay 506, over leads 514, 516, through tip and ring connections 517, 518, over leads 519, 521, through make-before-break contacts 522, 523 of a slow-to-release relay 524, over leads 526, 527, through the windings of double wound relay 528 to the left side of telephone repeater 529. From the right side of telephone repeater relay 529, through the windings of double wound relay 531, over leads 532, 533, through make-before-break contacts 534, 536 of relay 524, over leads 537, 538, through the tip and ring connections 539, 541 to the subscriber at the east station. Thus, telephonic communication can now be conducted over the above described circuit. It is to be observed that at this time the windings of relay 510 are in a loop circuit extending from the right side of repeater 508 to the left side of repeater 529.

When the west subscriber desires to send a printed message to the east subscriber, a key is depressed at the west subscriber's station as was described above. The subscriber at the east station will now throw his switch 800 to its lower or telegraph position. This opens the telephone circuits extending through contacts 802, 804, 808 and by means of contacts 812, 814 simulates a closure of contacts 388, 389 to place its telegraph set in receiving condition. Prior to this event, double wound relay 507 was in a balanced condition and its tongue 542 was in its unattracted position. Now, however, the relay 507 becomes unbalanced and contact 542 is attracted to close a circuit for the left winding of slow-to-release relay 506. This is due to the fact that as the key is depressed at the subscriber's station, line 332 is opened as explained and only the line 331 is carrying current. As relay 506 operates, it pulls up its contact tongues 543, 544, 546, 547, and 548. Contact tongue 543 by its closure, closes a circuit to all operated relays (not shown) controlled by relay 544A, known as the "S" relay of a standard district selector circuit.

Attraction of tongues 544, 546 by relay 506 breaks the previously described telephonic circuit and now extends the circuit path from the west subscriber station as follows: From the tip connection 501, through the make-before-break contacts 503 and tongue 504 (now closed), through the winding of relay 551 (and on a branching circuit over lead 552, through contact tongue 550 of relay 574, when energized, for a purpose to be later described), over lead 553, through contacts 554 controlled by cam 556 which is mounted on sleeve 557, over lead 558, through contact 559 controlled by swinger 561 operable by cam 580 carried by sleeve 575 to positive battery. A similar circuit extends from the ring connection 502, through make-before-break contacts 504 and tongue 546, now closed, through the winding of relay 562 (and on a branching circuit over lead 563, through contact tongue 560 of relay 568, when energized, for a purpose to be later described), over lead 564, through contacts 566 controlled by cam 556 and over lead 558 to swinger tongue 561 and contact 559 to positive battery.

Attraction of contact tongues 547, 548 by relay 506 breaks the circuit path previously described as extending from leads 514, 516, through the right side of telephone repeater 508. Now the circuit from lead 514 proceeds through make-before-break contact 513, tongue 548, over lead 567, through the winding of relay 568, over lead 569, through contacts 571 of cam 570 carried by sleeve 577 to ground. A branching circuit may extend through contact tongue 572 of relay 562, when energized, as will later be described. Similarly, a circuit now extends from lead 516, make-before-break contact 512, tongue 547, lead 573, winding of relay 574, lead 576, contacts 577 of cam 570 to ground. A branching circuit may also be provided through contact tongue 578 of relay 551, when energized, as will later be described.

It will be remembered that when a key is depressed at the west subscriber's station, only line 331 will carry current to provide the start pulse and, therefore, relay 551 will be energized and relay 562 will be de-energized. As relay 551 is so energized, a circuit now extends from grounded contact tongue 581 (now attracted) of relay 551, over lead 582, through the middle winding of relay 506, over lead 583, through contacts 584 of cam 570, and through the winding of clutch magnet 586. Thus, at this time, cam sleeve 575 will be released for a single rotation in the usual start-stop fashion. It will be evident that as relay 551 receives start pulses with each signal code combination, contact tongue 581 will be operated back and forth to send pulses through the middle winding of relay 506 to maintain this relay energized, since it is of the slow-to-release type.

With sleeve 575 released cam 580 will rotate and by means of its swinger contact 561 and contacts 559, 587, will send alternately positive and negative current to the west station through relays 551, 562, and over lines 331, 332 by means of previously described circuits. Thus, current reversals are provided for the vibrating motor 34 and the selector magnet 67 at the west subscriber's station. Relays 551, 562 will, therefore, be energized or de-energized depending on the signals transmitted from the keyboard at the west subscriber's station and accordingly operate their respective contact tongues 578, 572.

As cam 570 rotates, contacts 584, 571, 577 will open and contact 589 will close. Opening of contacts 571, 577 breaks the previously described circuits for relays 568, 574 preventing their operation when transmission is from west to east and closure of contact 589 extends an obvious current reversal circuit from lead 591, over lead 592 to contact tongue 578 of relay 551 and contact tongue 572 of relay 562. As relay 551 operates on receipt of the start pulse, positive battery will proceed through contact 578, over leads 573, 516, 521 to the circuit previously described as extending through the upper winding of relay 528, in the incoming circuit, then over lead 585 and through contact tongue 575 of a standard incoming T relay to the standard A retardation coil and A relay. A similar circuit will not extend through contact tongue 572 of relay 562 and, therefore, no current will be provided on lead 519 for the lower winding of relay 528 over lead 590 and tongue 595A of the T relay. Relay 528 will now become unbalanced and attract its contact tongue 593, and complete an obvious circuit for the right-hand winding of relay 524. As relay 524 operates, it attracts its contact tongues 594 to 599, inclusive. Operation of contact tongues 596, 597 respectively operate make-before-break contacts 523, 522 taking double wound relay 528 and repeater 529 out of the original described circuits. Now the circuit from lead 519 extends through make-before-break contacts 522, tongue 597, over lead 601, through the winding of relay 602, over lead 603, through contacts 709 controlled by cam 606, carried by sleeve 607 to ground. Similarly, the circuit from lead 521, make-before-break contacts 523 tongue 596, through the winding of relay 608, over lead 609, through contacts 604 controlled by cam 606, to ground. A branching circuit also extends from contact tongue 597, over lead 601 to contact tongue 612 of relay 613 (when energized) as will later be described. Another branching circuit extends from contact tongue 596 over lead 614 to contact tongue 616 of relay 617 (when energized) as will later be described. It should now be apparent at this point that in accordance with the operation of relays 551, 562 at the west subscriber's station, contacts 578, 572 will transmit signals over leads for 521, 519 to respectively cause operation of relays 608, 602 in an identical manner. Operation of contact tongues 594, 595 by relay 524 serves to hold the incoming circuit operated during telegraph transmission by means of circuits extending respectively over leads 621, 622 for the A retardation coil and for the T relay. Relay 524 is a slow-to-release relay and will be maintained energized by start pulses received from operation of contact 623 of relay 608 according to telegraph signals.

Operation of contact tongues 598, 599 by relay 524 breaks the first described circuit extending from incoming lines 537, 538 to the right side of telegraph repeater 529. The circuit from lead 537 now extends through make-before-break contacts 534, tongue 598, lead 626, tongue 627, when attracted by relay 608, over lead 628, contacts 629 (when closed) controlled by cam 631, carried by sleeve 632, over lead 633 to swinger 634 which is operable by cam 635 carried by sleeve 632 to swing between contacts 636 and 637 to provide current reversals. As the start pulse is received by relay 608, contact 623 is attracted, and a circuit which was previously referred to is completed through the left winding of relay 524, over lead 638, through contacts 639 controlled by cam 631 and over lead 641 for the clutch magnet 642 which controls the release of cam sleeve 632 in start-stop fashion for a single revolution. Thus, at this time, cam 635 will provide current reversals over lead 633 through contacts 629 which is now closed by cam 631 to lead 628.

A branching circuit extends from tongue 598 of relay 524, over lead 644, through the winding of relay 617, over lead 646, through contacts 647 controlled by cam 631, over lead 648 to swinger tongue 649 which is operated by cam 651 between contacts 652, 653 to provide current reversals.

The circuit from lead 538 now extends through contacts 536, through tongue 599, through tongue 600, when closed by energization of relay 602, to the previous circuit extending over lead 628. A branching circuit extends from tongue 599, over lead 654, through the winding of relay 613, over lead 656, through contacts 657 controlled by cam 631 and to the circuit previously described as extending over lead 648.

Now as cam sleeve 632 rotates, contacts 639, 657 and 647 are opened by cam 631 while contacts 629 close as previously indicated. This opens the described circuits for relays 617, 613 preventing their operation when transmission is from west to east.

It should now be evident that the identical signals received by relays 551, 562, are repeated respectively by relays 608, 602 which by means of their respective contacts 627, 600 repeat the signals to the east subscriber's station. Current reversals for the motor 34 and selector magnet 67 at the west subscriber's station are provided by operation of cam 580 while current reversals for the motor 34 and selector magnet 67 at the east subscriber's station are provided by operation of cam 635.

Transmission from the east to the west is accomplished in an identical manner as will now be described and a detailed description, therefore, will not be repeated except where necessary for the sake of clarity. At this time the west subscriber will move his switch 800 to its lower or telegraph position. When a key at the east station is depressed for transmission of a character, the circuit for double wound relay 531 becomes unbalanced, attracting contact tongue 701 and completing a circuit for the right-hand winding of relay 524 over lead 702. Relay 524 operates exactly as before and with its various contact tongues attracted, it will be remembered that the windings of relay 617, 613 are in series with lines 331, 332 from the east station through the respective tongues 598, 599. However, only line 331 is carrying current at this time, and only relay 617 receives the start pulse. When relay 617 operates, it attracts its contact tongue 704 and a circuit is now completed from grounded contact 704, over lead 706 through the middle winding of relay 524, over lead 707, through contacts 708 controlled by cam 606, over lead 709 and through the winding of clutch magnet 711. By means of the just described circuit, slow to release relay 524 will receive continual pulses and remain energized while telegraph transmission is taking place. Cam sleeve 607 is released at this time for a single revolution in start-stop fashion and a current reversal circuit extends from the swinger contact 649 associated with cam 651, over lead 648, through contacts 712, now closed as cam 606 rotates, over lead 713, through the tongues 616, 612 when operated by their respective relays 617, 613, over leads 614, 601, through tongues 596, 597, through make-before-break contacts 523, 522, over leads 521, 519 and leads 516, 514, through make-before-break contacts 512, 513 of relay 506 and through both windings of double wound relay 510. However, only relay 617 is receiving a pulse at this time and only contact 616 closes its circuit. The initially described loop circuit for the double wound relay 510 is now broken as relay 524 operates and a new loop circuit cannot be completed through tongues 596, 597 since contact 612 of relay 613 is now open. Only relay 617 is pulsed at this time and attracting its tongue 616. Therefore, relay 510 now releases. When cam 606 rotates, contacts 709, 604 open and prevent the operation of relays 608 and 602 when signals are transmitted from east to west. When the talking connection was completed, a standard CS relay 730 in the district selector circuit operated. As relay 730 operated and attracted tongue 740, relay 719 operated and locked up from contact tongue 721 of CO relay 720 over lead 760 and tongue 770. Now as relay 510 is released, a circuit is completed from contact tongue 780 of relay 719, over lead 717, and through tongue 716 of relay 510 to the left winding of relay 506.

Operation of relay 506 and attraction of its tongues 547, 548 now places relays 574, 568 in the circuits previously described. However, only relay 574 receives the start pulse at this time. Attraction of contact tongue 722 by relay 574 completes a circuit established over lead 723, through the right winding of relay 506 over lead 724, through contacts 726, over lead 727 and through the winding of clutch magnet 728 which now releases cam sleeve 557. As cam 556 rotates for a single revolution in start-stop fashion, contacts 554, 566 open and prevent the completion of the circuit for relays 551, 562 while transmission takes place from east to west. However, contacts 729 are now closed by cam 556 and current reversals for the west station printer are provided as swinger 731 moves between contacts 732, 733 when operated by cam 734. The circuit proceeds over lead 736, through contact 729, over lead 737, through contacts 550, 560, when operated by their respective relays 574, 568 over leads 552, 563, through tongues 544, 546 (now attracted) of relay 506 to the west subscriber station. Only relay 574 will be operated at this time and, therefore, only lead 331 extending to the west station will carry current and thus provide a start impulse for the selector magnet 67 of the printer located at that station. It should now be evident that signals originating from the east station by operation of the keyboard thereat will now operate relays 617, 613 which by means of contact tongues 616, 612, repeats the signals respectively to relays 574, 568. As contact tongues 550, 560 are operated by the just mentioned relays, signals are repeated to the east subscriber's station.

If transmission is from west to east and a key is not operated for a predetermined interval, relay 506 will become unoperated, and return the various circuits to telephonic condition. Similarly, if the transmission is from east to west slow to release relay 524 may be released under similar conditions to return the various circuits to telephonic condition. Thus, by means of the circuits just described, telephonic or telegraphic communication may be carried and the printers at oppositely located stations will print identical copy. Cutoff relay 751 and line relay 752 are parts of a standard district selector circuit and their operation is well known in the telephone art. It is, therefore, deemed unnecessary to describe these relays as they form no part of the present invention.

A résumé of the operations will now be described assuming that the west station subscriber desires to call the east station subscriber. The west subscriber removes the handset 327 from the telephone cradle. Operation of contact bank 300 places the circuit in condition for telephonic communication. Upon hearing the dial tone the subscriber knows he has been connected to an idle sender circuit. Next the subscriber depresses the individual keys which represent the phone number of the called subscriber. As a key is depressed the line 332 opens as described and cams 337, 339 rotate to provide the current reversals for operation of selector magnet 67 and motor 34. Selector magnet 67 remains balanced until the first negative current is received at which time motor 34 is operated. During receipt of the first positive pulse and the first negative pulse magnet 333 remains unbalanced. Transmitting contacts 303, 304 are selectively operated for the five elements of the code and accordingly relay 333 is operated. During the stop interval, positive current is provided for both windings of selector magnet 67 and for both windings of magnet 333. Thus at this time shaft 60 at the subscriber's station and cam sleeve 341 at the exchange are brought to rest. The transmitting cycle just described is repeated until all the individual alphabetical and numerical designations which represent the called subscriber's station are transmitted.

An idle district selector and incoming circuit are now selected. The bell at the east subscriber station is rung in the usual manner and the subscriber at the east station removes the handset from the cradle. The telephone conversation may take place in the usual manner. If the west subscriber desires to send a typed message, the east subscriber moves manual switch 800 to its downward position. Permutation code signals may now be transmitted to the receiver at the east subscriber station. It will be remembered that contact bank 281 at the transmitting station is maintained in its upward or telegraph position by the continual operation of the keys of the transmitter. When the east station wishes to transmit, the switch 800 thereat is moved to the upward position while the same switch at the west station is moved to the downward position. Clutch magnets 586 and 728 in the district selector circuit and clutch magnets 642, 711 in the incoming circuit operate in the usual start-stop fashion. Cams 575, 734, 635 and 651 which provide the current reversals are each equivalent to the two cams 337, 339 shown in Fig. 25.

Various changes and modifications may be made in the present invention without departing from the spirit or scope thereof.

What is claimed is:

1. In a telegraph transmission system, a pair of signal lines, a double wound selector magnet having a winding in series with each of said lines, means for generating current reversals for simultaneous transmission over said lines, a rectifier and a rectifier shunting means for controlling the passage of current over one of said lines, a second oppositely poled rectifier and a second rectifier shunting means for controlling the passage of current over the other one of said lines, means operable in accordance with signal code combinations for selectively controlling the operation of both of said shunting means to allow the passage of current over at least one of said lines to one of said windings of said selector magnet or over both of said lines to both of said windings of said selector magnet, said selector magnet being operated in one manner when both windings are energized and in an opposite manner when only one of said windings is energized according to said signal code combinations.

2. A telegraph transmission system including a pair of signal lines, a double wound selector magnet having a winding in series with each of said lines, means for generating current reversals for simultaneous transmission over said lines, a transmitting contact for controlling the passage of current over one of said lines, means connected to one of said lines for limiting the flow of current to a single direction, a second transmitting contact for controlling the passage of current over the other one of said lines, means connected to the other of said lines for limiting the flow of current to a direction opposite to that of the first limiting means, selector means operable in synchronism with each current reversal and responsive to individual code combinations for controlling said transmitting contacts to allow in conjunction with said current direction limiting means the passage of current over at least one line or over both lines to at least one winding or both windings of said selector magnet, said selector magnet being operated in one manner when both of said windings are energized and in an opposite manner when only one of said windings is energized in accordance with said signal code combinations.

3. A telegraph transmission system including a pair of signal lines, means for generating current reversals for simultaneous transmission over said lines, transmitting means for controlling the passage of current over one of said lines, said transmitting means including means for limiting the passage of current to unidirectional flow, a second transmitting means for controlling the passage of current over the opposite one of said lines, said second transmitting means including means for limiting the passage of current to unidirectional flow in a direction opposite to that permitted by the first current limiting means, means operable in accordance with signal code combinations to control both of said transmitting means to allow the passage of current over one or both of said lines for each element of said signal code combinations and means associated with said lines and responsive to the receipt of current over one or both of said lines to repeat said signal code combinations.

4. A telegraph transmission system, including a pair of signal lines, means for generating current reversals for simultaneous transmission over said lines, transmitting means for controlling the passage of current over one of said lines, a second transmitting means for controlling the passage of current over the opposite one of said lines, means connected to each of said lines for limiting the flow of current therein to a different unidirectional flow, a series of selectable elements operable in synchronism with said current reversal means and in accordance with signal code combinations to control both of said transmitting means to allow the passage of current over one or both of said lines for each element of a signal code combination, and means responsive to the receipt of current over one or both of said lines to repeat said signal code combinations.

5. A telegraph transmission system, including a pair of signal lines, means for generating current reversals for simultaneous transmission over said lines, means to limit the flow of current in each line to one direction and which flow is different in each of said lines, transmitting means for controlling in conjunction with one of said current limiting means the passage of current over one of said lines, a second transmitting means for controlling in conjunction with the other one of said current limiting means the passage of current over the opposite one of said lines, a series of selectable elements operable in accordance with signal code combination to control both of said transmitting means to allow the passage of current over one or both of said lines for each element of a signal code combination, a keyboard for controlling the operation of said selectable elements, and means responsive to the receipt of current over one or both of said lines to repeat said signal code combinations.

6. A telegraph transmission system, including a pair of signal lines, means for generating current reversals for simultaneous transmission over said lines, means for limiting the flow of current to a single direction over each of said lines, a transmitting contact for controlling in cooperation with said limiting means the passage of current over one of said lines, a second transmitting contact for controlling in cooperation with said limiting means the passage of current over the opposite one of said lines, a lever individual to each of said contacts, a series of selectable elements operable in accordance with signal code combinations to control the operation of said levers to thereby selectively operate said transmitting contacts and enable the passage of current over one or both of said lines for each element of a signal code combination, means for controlling the operation of said selectable elements, and means responsive to the receipt of current over one or both of said lines to repeat said signal code combinations.

7. A telegraph transmission system, including a pair of signal lines, means for generating current reversals for simultaneous transmission over said lines, means for limiting the passage of current over one or both of said lines to unidirectional flow, means operable in accordance with signal code combinations for rendering said current limiting means effective, recording means, and a double wound selector magnet for controlling said recording means and having a winding in series with each of said lines, said selector magnet being operable to one condition when both of said windings are energized and to an opposite condition when only one of said windings is energized to thereby control said recording means in accordance with the receipt of said signal code combinations and a vibrating motor operable by said current reversals for operating said recording means.

8. A telegraph transmission system, including a pair of signal lines, means for generating current reversals for simultaneous transmission over said lines, means for normally limiting the flow of current over each line to a flow in one direction which is of opposite direction in each line, means for allowing the passage of current over one or both of said lines in accordance with signal code combinations, recording means, a double wound selector magnet for controlling said recording means and having a winding in series with each of said lines, said selector magnet being operable to one condition when both of said windings are energized and to an opposite condition when only one of said windings is energized to thereby control said recording means, and a vibrating motor normally at rest for operating said recording means and initiated into operation for the duration of each of said signal code combinations by the receipt of said current reversals.

MARTHA W. C. POTTS,
*Executrix Under the Last Will and Testament of Louis M. Potts, Deceased.*

REFERENCES CITED

The following references are of record in the file of this patent:

UNITED STATES PATENTS

| Number | Name | Date |
|---|---|---|
| 2,072,079 | Blodgett | Mar. 2, 1937 |
| 2,123,220 | Weld | July 12, 1938 |
| 2,355,934 | Weld | Aug. 15, 1944 |
| 2,364,771 | Bascom et al. | Dec. 12, 1944 |

FOREIGN PATENTS

| Number | Country | Date |
|---|---|---|
| 363,696 | Great Britain | Dec. 21, 1931 |
| 191,697 | Switzerland | June 30, 1935 |